United States Patent
Overley

(10) Patent No.: US 10,899,562 B2
(45) Date of Patent: Jan. 26, 2021

(54) APPARATUS FOR TRANSFERRING AND/OR STACKING PRODUCTS

(71) Applicant: The Procter & Gamble Company, Cincinnati, OH (US)

(72) Inventor: Matthew Bernard Overley, Deerfield Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/199,590

(22) Filed: Nov. 26, 2018

(65) Prior Publication Data

US 2019/0193957 A1 Jun. 27, 2019

Related U.S. Application Data

(60) Provisional application No. 62/610,617, filed on Dec. 27, 2017.

(51) Int. Cl.
*B65G 57/03* (2006.01)
*B65G 57/18* (2006.01)

(52) U.S. Cl.
CPC ......... *B65G 57/035* (2013.01); *B65G 57/186* (2013.01); *B65G 2814/0307* (2013.01)

(58) Field of Classification Search
CPC ................ B65G 57/035; B65G 57/186; B65G 2814/0307; B65G 57/11; B65G 57/14
USPC ................ 198/597, 475.1, 418.4, 418, 479.1
See application file for complete search history.

(56) References Cited

U.S. PATENT DOCUMENTS

| | | | |
|---|---|---|---|
| 1,274,830 A | 8/1918 | Wood | |
| 1,449,027 A | 3/1923 | Neal | |
| 2,387,674 A | 10/1945 | Donald | |
| 3,144,120 A | 8/1964 | Neibeisel | |
| 3,462,001 A | 8/1969 | Boyce | |
| 3,627,147 A | 12/1971 | Yowell et al. | |
| 3,698,153 A | 10/1972 | Lieberman | |
| 3,713,266 A | 1/1973 | Crow, Jr. | |
| 3,804,228 A | 4/1974 | Felstehausen | |
| 3,866,741 A | 2/1975 | Carbon | |
| 3,897,877 A | 8/1975 | Vandermeer | |
| 4,026,422 A | 5/1977 | Leenaards | |
| 4,124,967 A | 11/1978 | Beer | |

(Continued)

FOREIGN PATENT DOCUMENTS

| DE | 2519266 A1 | 6/1976 |
|---|---|---|
| EP | 0566839 A2 | 10/1993 |

(Continued)

OTHER PUBLICATIONS

U.S. Appl. No. 16/199,610, filed Nov. 26, 2018, Matthew Bernard Overley, et al.

(Continued)

*Primary Examiner* — Lynn E Schwenning
(74) *Attorney, Agent, or Firm* — Richard L. Alexander; Andrew J. Mueller

(57) ABSTRACT

An apparatus for transferring and/or stacking products, the apparatus including a frame, a bar conveyor associated with the frame, the bar conveyor having a plurality of flight bars that are independently driven by a plurality of independent drivetrains, a lifting device having a lifting plate, the lifting device being located within the bar conveyor, and at least one pusher.

20 Claims, 27 Drawing Sheets

(56) References Cited

U.S. PATENT DOCUMENTS

| | | |
|---|---|---|
| 4,210,237 A | 7/1980 | Gram |
| 4,302,141 A | 11/1981 | Miguel |
| 4,469,219 A | 9/1984 | Gosse |
| 4,629,056 A | 12/1986 | Simelunas |
| 4,711,612 A | 12/1987 | Kwauka |
| 4,712,787 A | 12/1987 | Princiotta, Sr. |
| 4,787,499 A | 11/1988 | Lodi |
| 4,934,509 A * | 6/1990 | Gilgien .............. B65G 17/26 198/460.1 |
| 4,978,275 A * | 12/1990 | Reid .................. B65G 57/005 198/419.1 |
| 5,038,549 A * | 8/1991 | Nordstrom ........... B65B 11/22 414/794.9 |
| 5,123,231 A | 6/1992 | Fallas |
| 5,287,953 A | 2/1994 | Mims |
| 5,301,793 A | 4/1994 | Kovacs |
| 5,383,760 A | 1/1995 | Cawley |
| 5,431,530 A | 7/1995 | Kobayashi |
| 5,461,846 A | 10/1995 | Cormier |
| 5,533,859 A | 7/1996 | McHenry |
| 5,699,655 A | 12/1997 | Kuboyama |
| 5,803,706 A | 9/1998 | Achelpohl |
| 5,813,196 A | 9/1998 | Page |
| 5,842,827 A * | 12/1998 | Kwasniewski ...... B65G 57/035 414/802 |
| 5,873,450 A | 2/1999 | Rusch |
| 5,979,634 A | 11/1999 | Odegard |
| 6,056,109 A | 5/2000 | Hidai |
| 6,427,825 B1 | 8/2002 | Biagiotti |
| 6,820,750 B2 | 11/2004 | Gambini |
| 6,866,140 B2 | 3/2005 | Iwasa |
| 7,021,450 B2 | 4/2006 | Jones, Jr. |
| 7,413,070 B2 | 8/2008 | Mayer |
| 7,788,886 B2 | 9/2010 | Aquarius |
| 8,413,790 B2 | 4/2013 | Nilsson |
| 8,657,555 B2 * | 2/2014 | Kokubo ............... B65H 31/20 271/215 |
| 8,770,382 B2 | 7/2014 | Tas |
| 8,915,349 B2 | 12/2014 | Tas |
| 9,073,709 B2 * | 7/2015 | Magri ................. B65G 57/035 |
| 9,260,256 B2 * | 2/2016 | Christensen .......... B65G 47/90 |
| 9,802,768 B2 * | 10/2017 | Overley ............... B65G 47/24 |
| 10,071,868 B2 * | 9/2018 | Overley ............... B65G 57/08 |
| 10,370,200 B2 * | 8/2019 | Overley ............. B65G 57/035 |
| 2001/0042673 A1 * | 11/2001 | Nakanishi ............ B65G 47/29 198/419.3 |
| 2005/0178090 A1 | 8/2005 | Koke |
| 2008/0247859 A1 | 10/2008 | Smets |
| 2010/0287885 A1 * | 11/2010 | Paganini ............ B65G 57/32 53/447 |
| 2013/0243558 A1 * | 9/2013 | Beer .................. B65G 47/766 414/791.6 |
| 2015/0307292 A1 * | 10/2015 | Ahlers ................ B65G 57/14 414/793.5 |
| 2016/0311628 A1 | 10/2016 | Roehring |
| 2017/0121132 A1 | 5/2017 | Overley |
| 2017/0121133 A1 | 5/2017 | Overley |

FOREIGN PATENT DOCUMENTS

| | | |
|---|---|---|
| EP | 1961679 A1 | 8/2008 |
| FR | 2383102 A1 | 10/1978 |
| JP | S5193052 A | 8/1976 |
| JP | H1111674 A | 1/1999 |
| JP | 2008068895 A | 3/2008 |
| JP | 2015030615 A | 2/2015 |

OTHER PUBLICATIONS

PCT International Search Report dated Feb. 3, 2017—6 pages.
PCT International Search Report dated Feb. 6, 2017—7 pages.
All Office Actions U.S. Appl. No. 14/926,046.
All Office Actions U.S. Appl. No. 16/199,590.
All Office Actions U.S. Appl. No. 14/926,052.
All Office Actions U.S. Appl. No. 16/199,610.

* cited by examiner

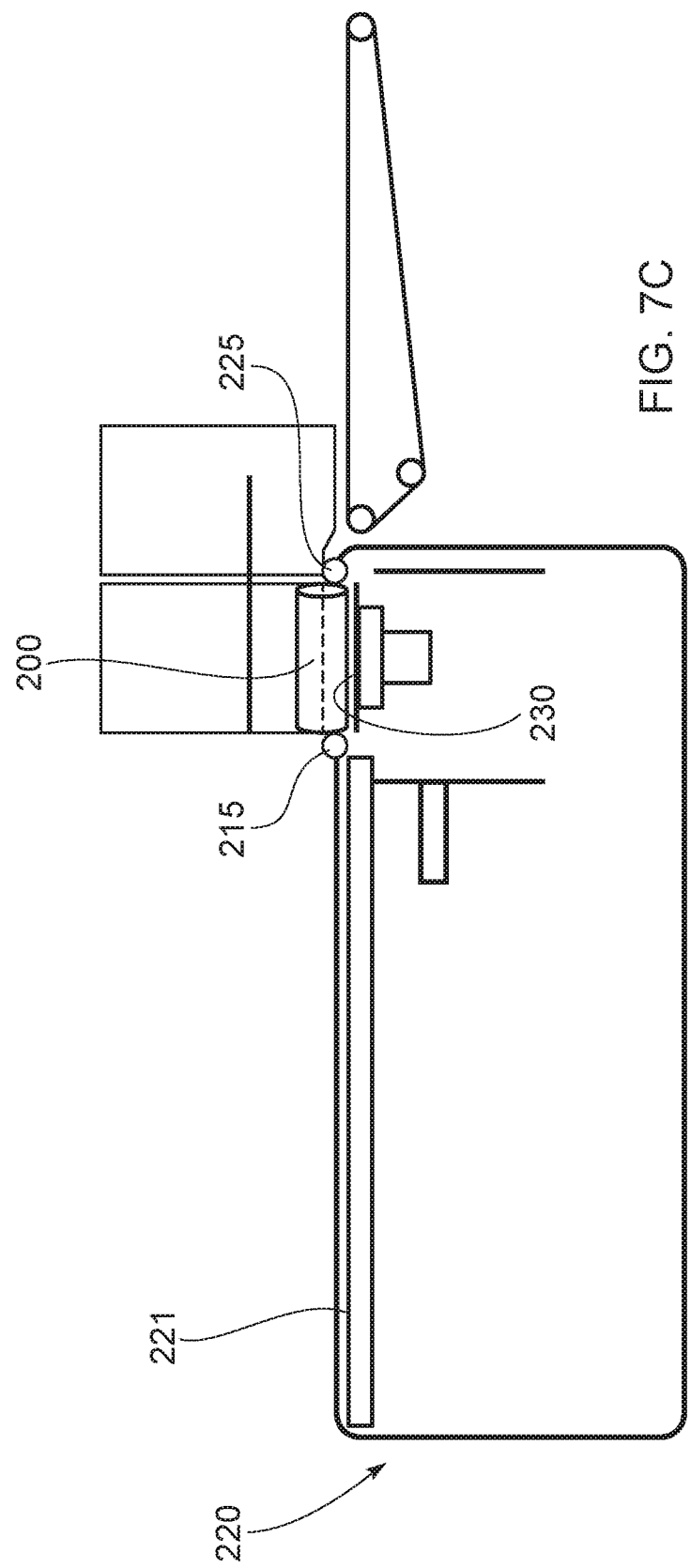

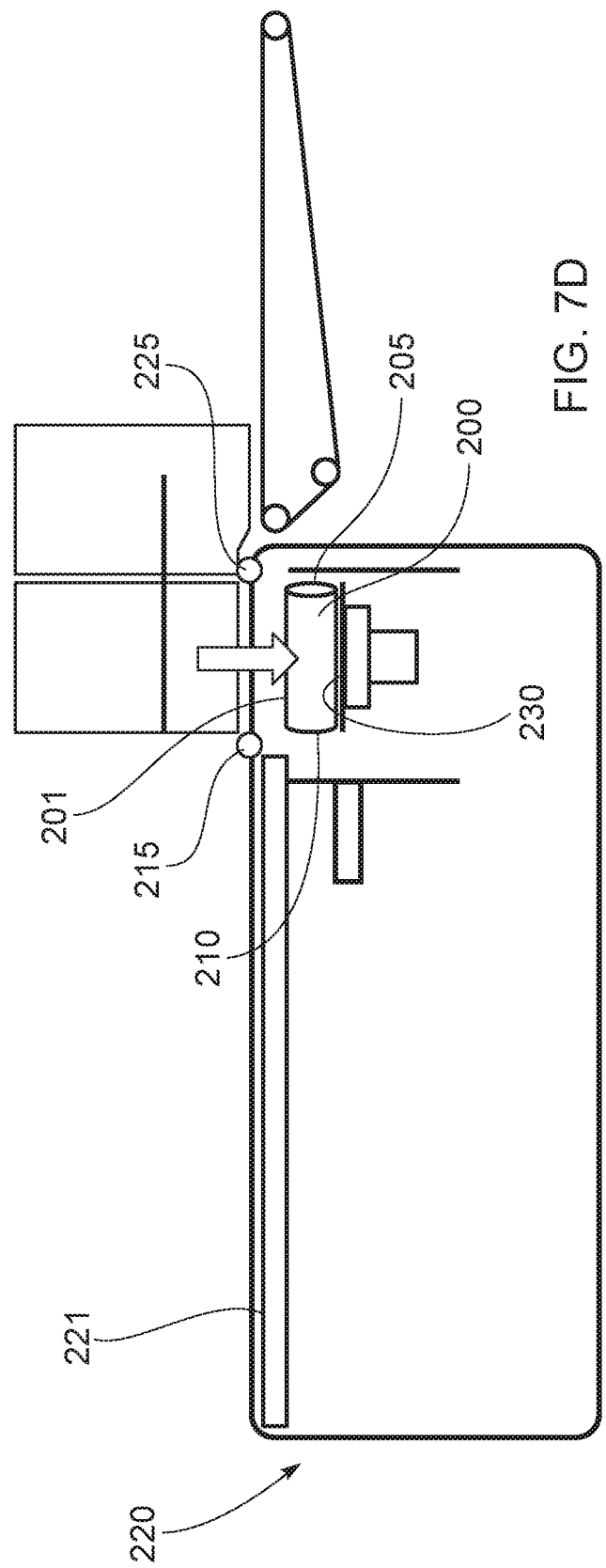

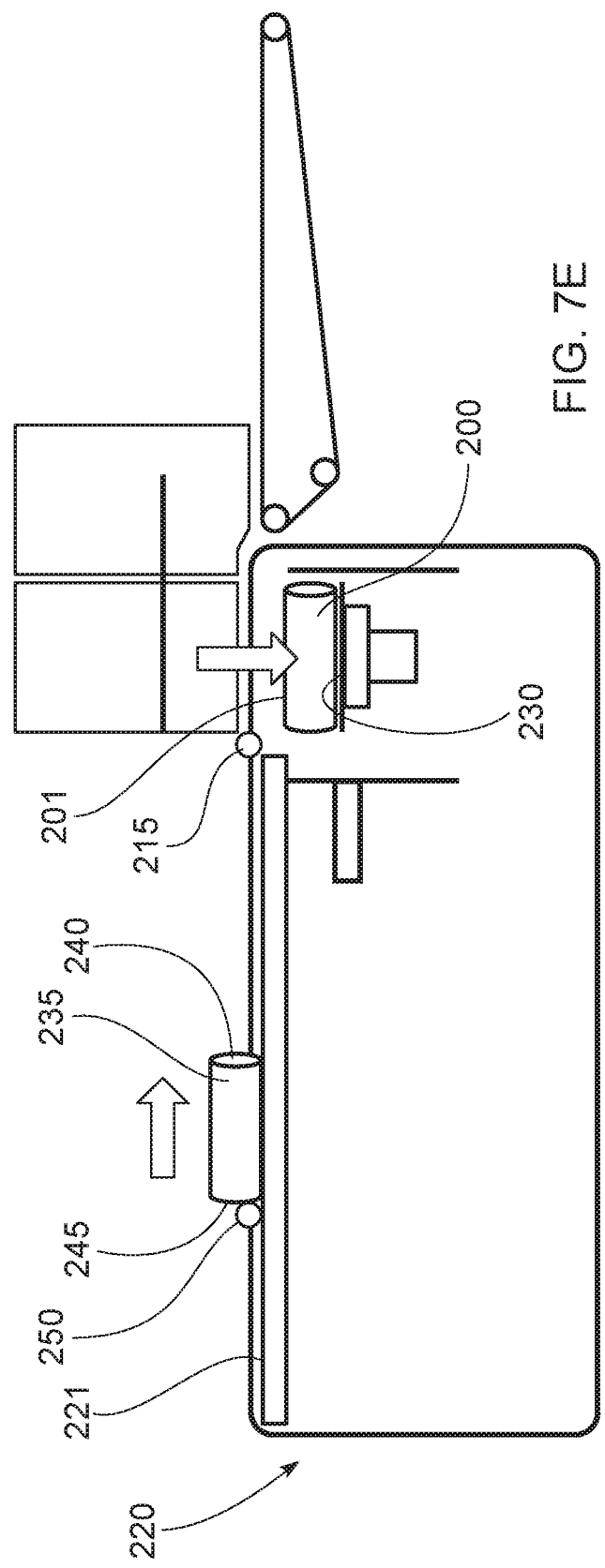

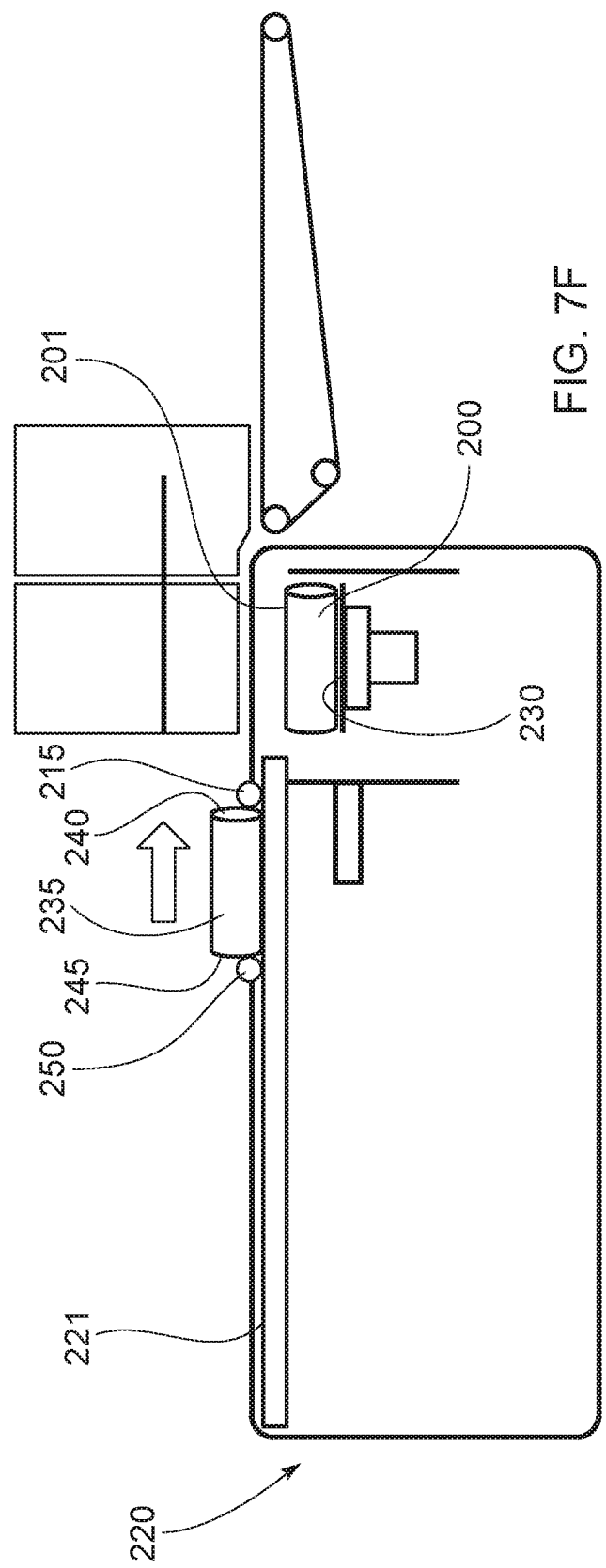

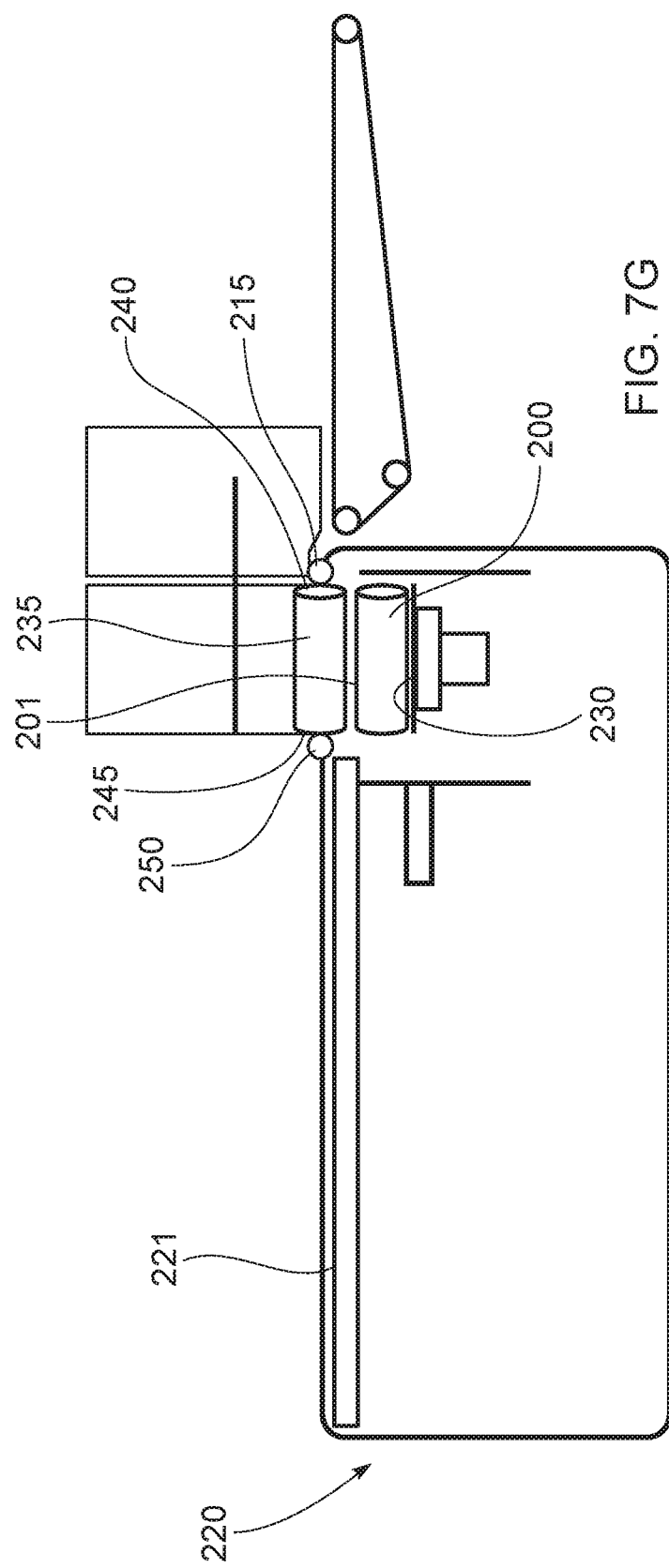

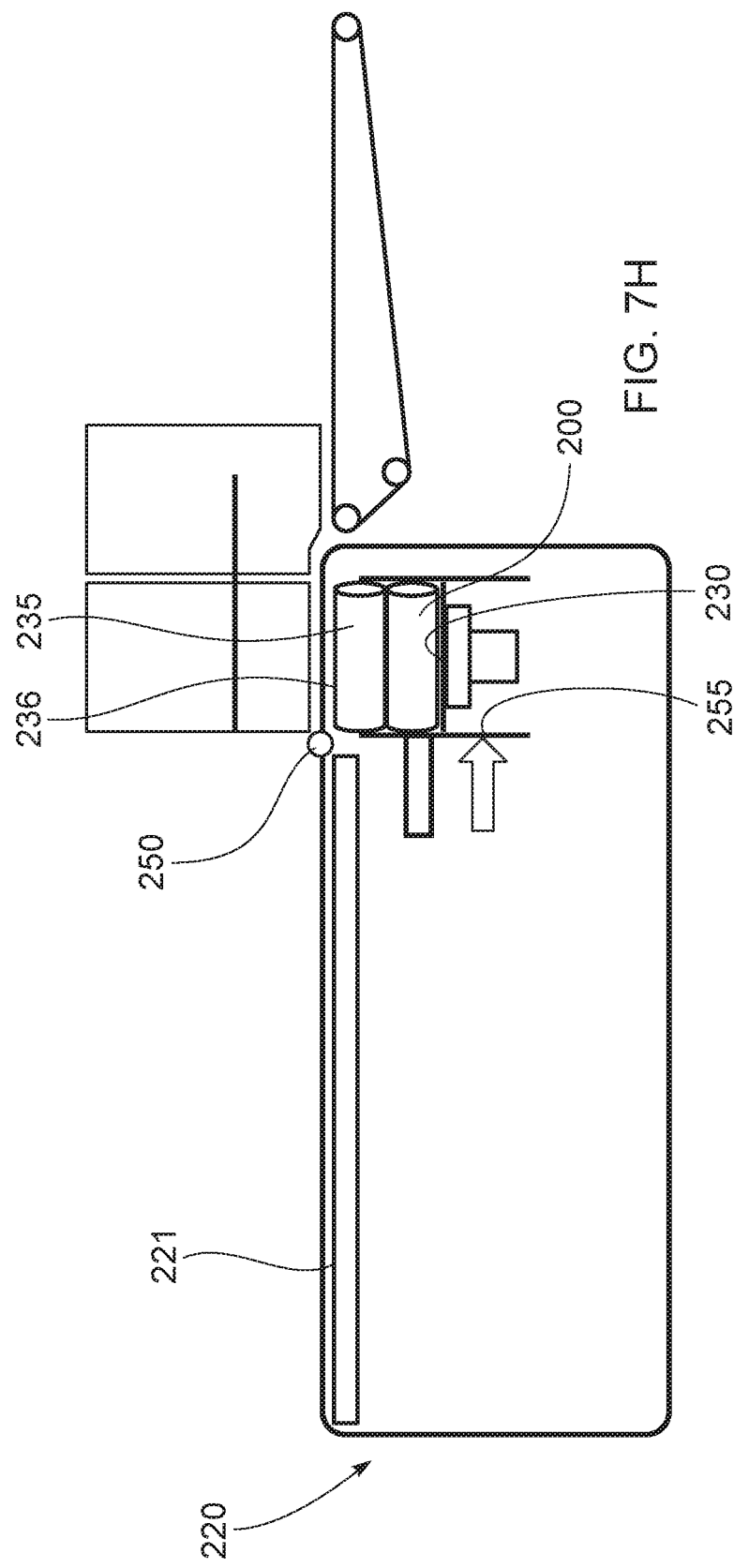

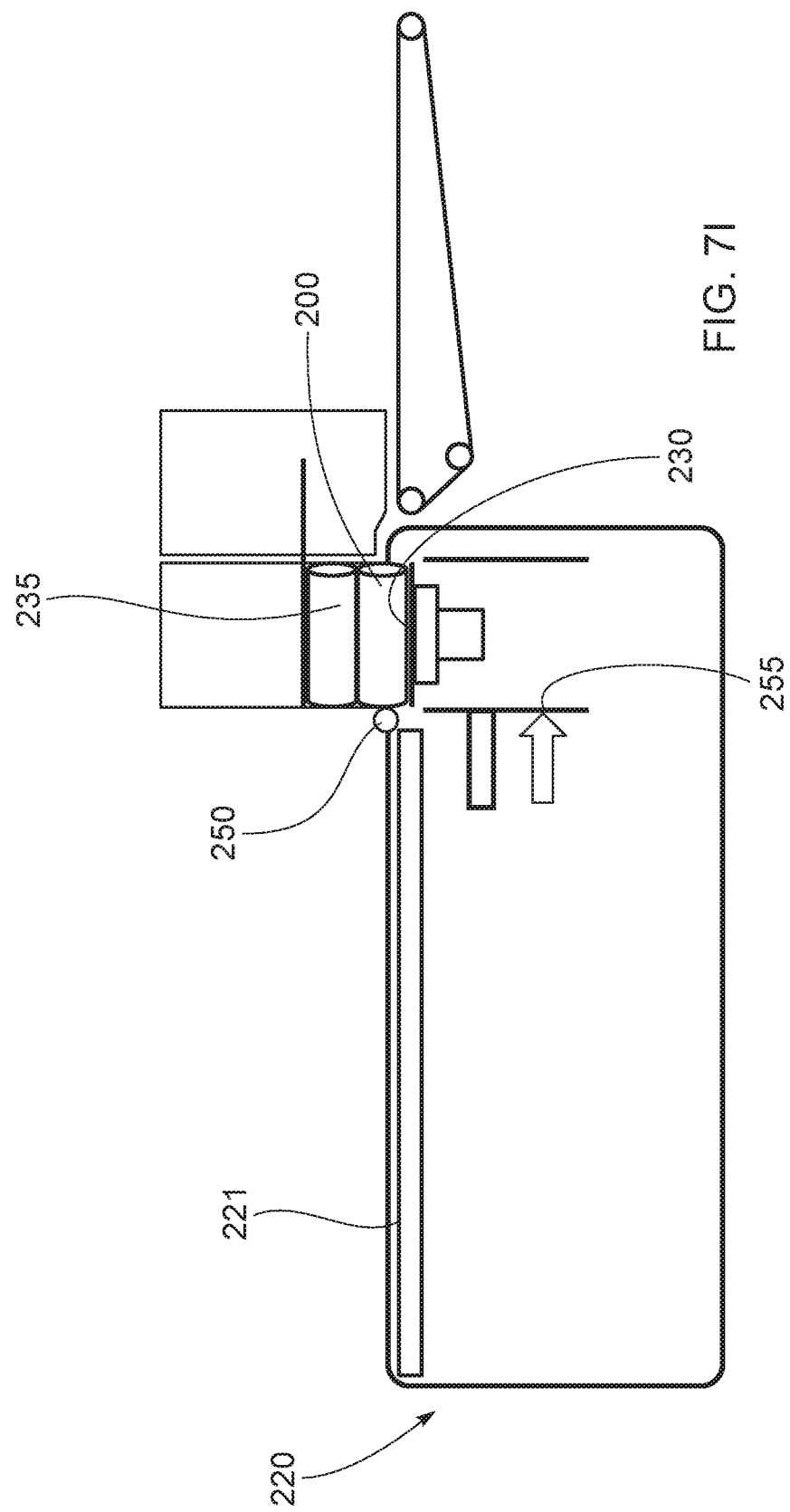

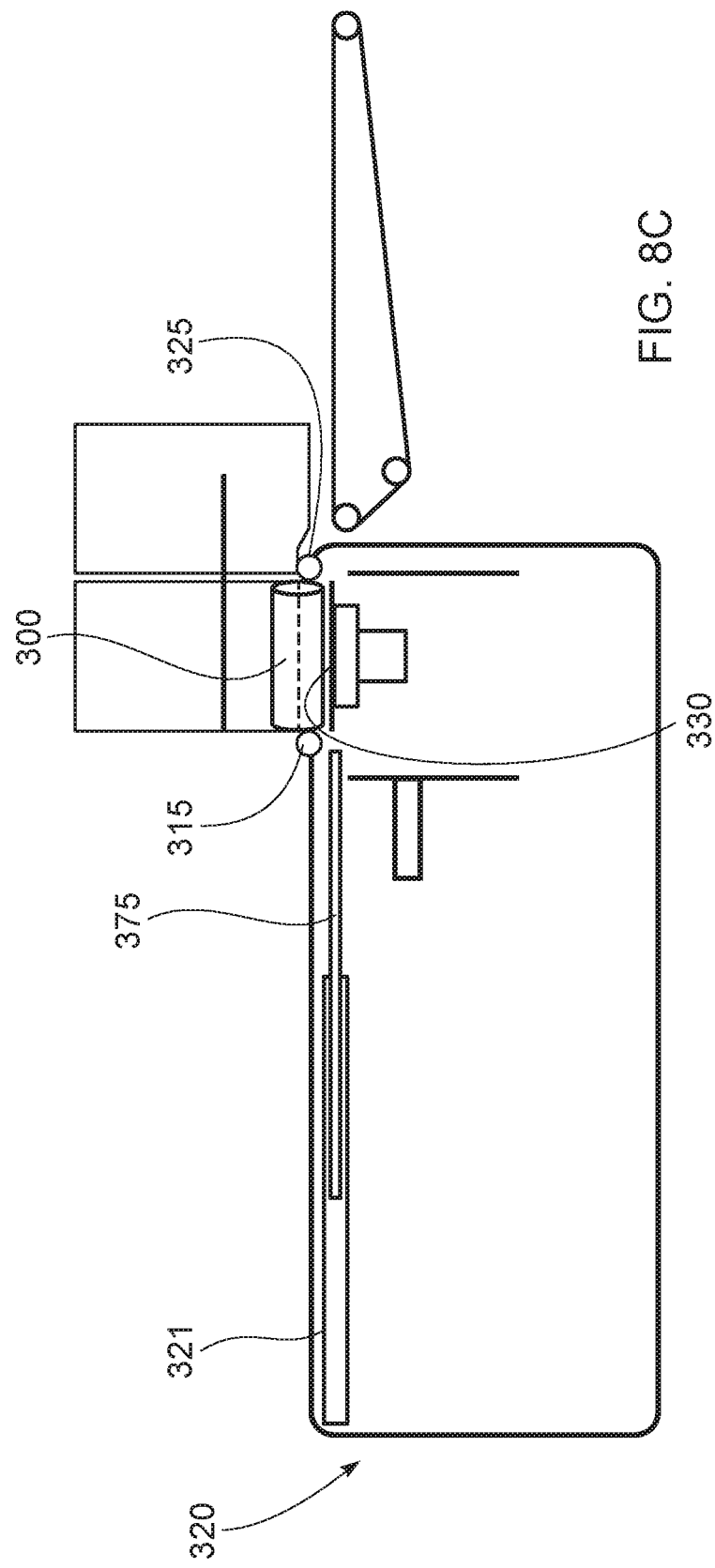

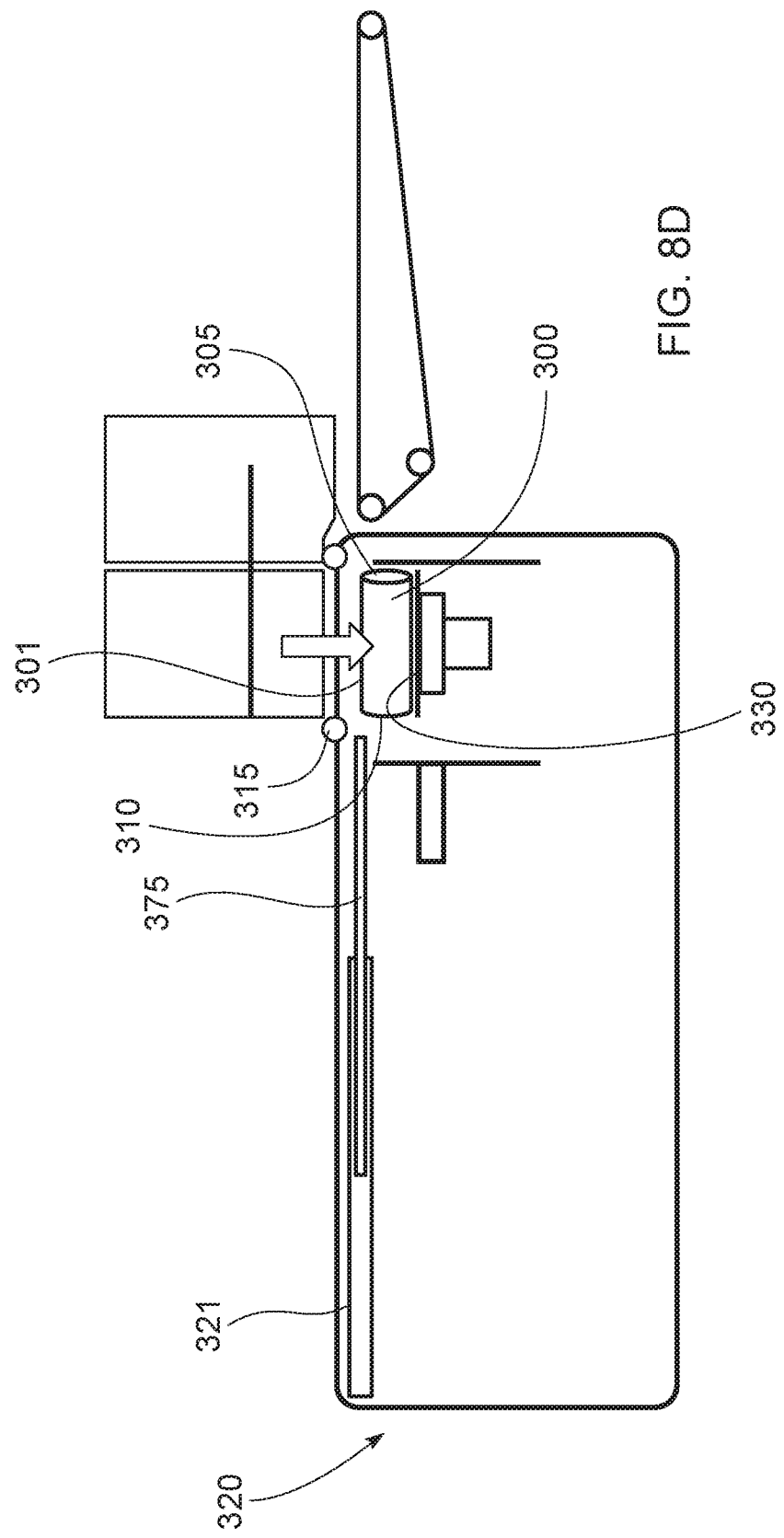

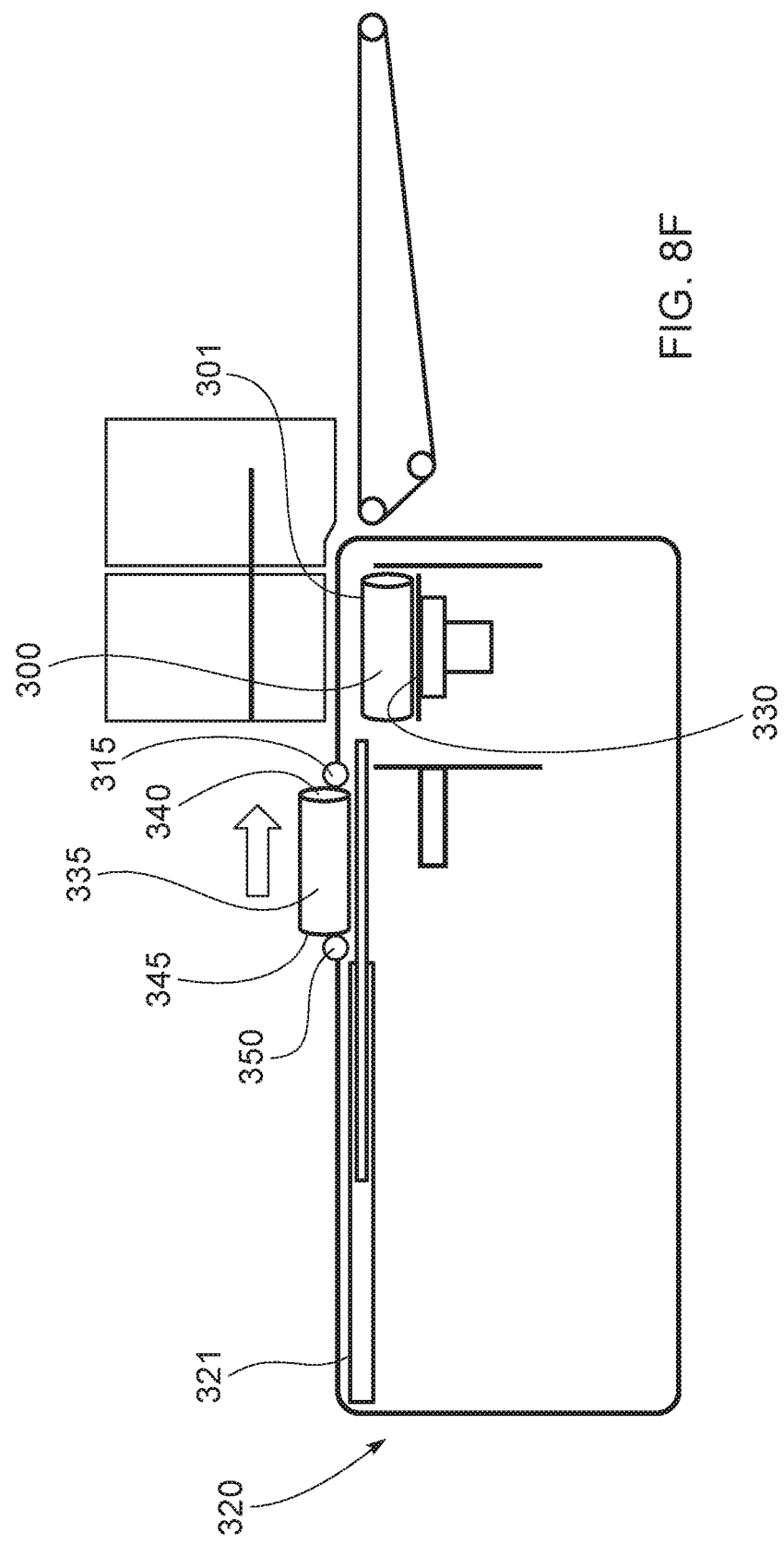

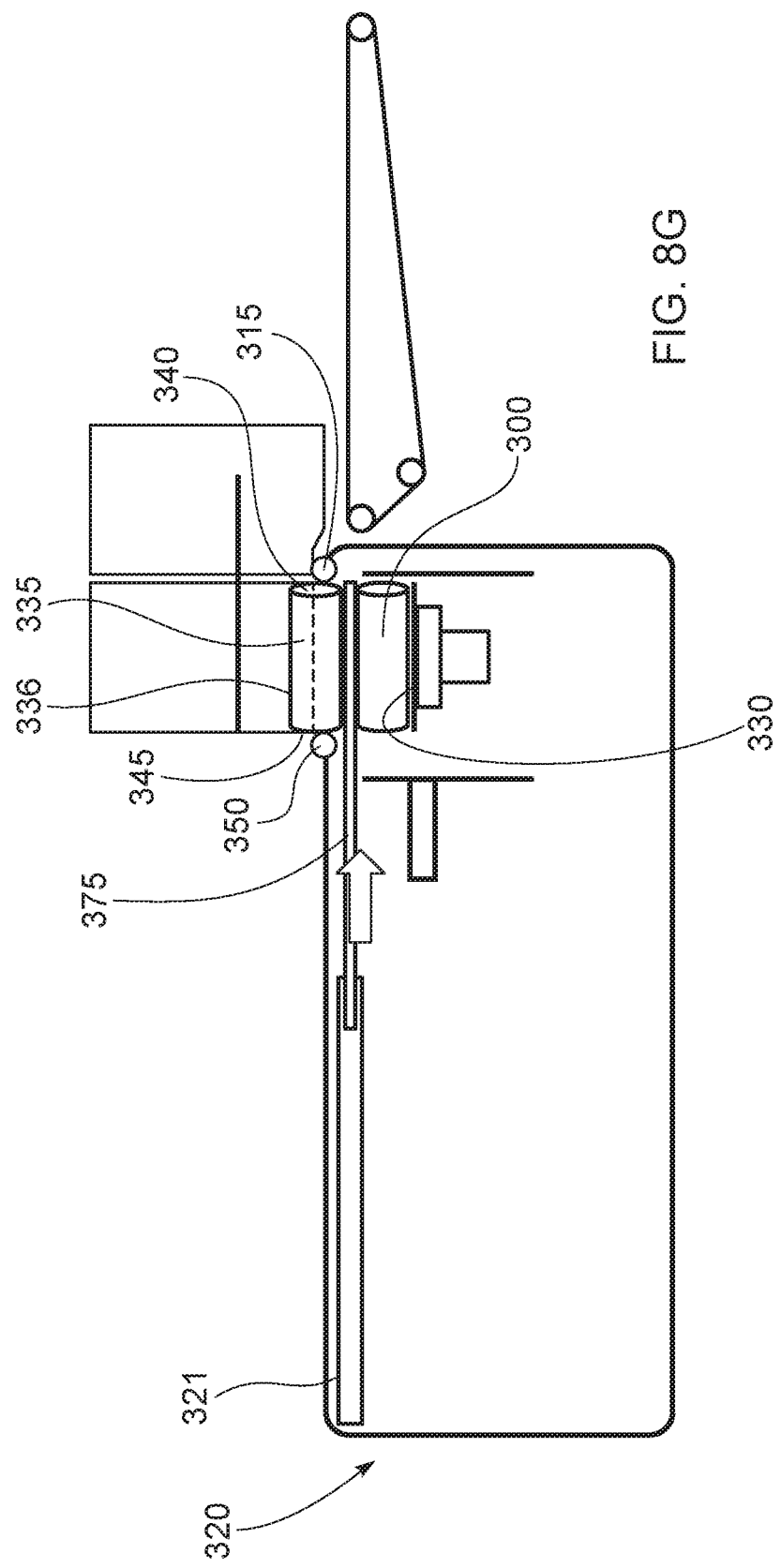

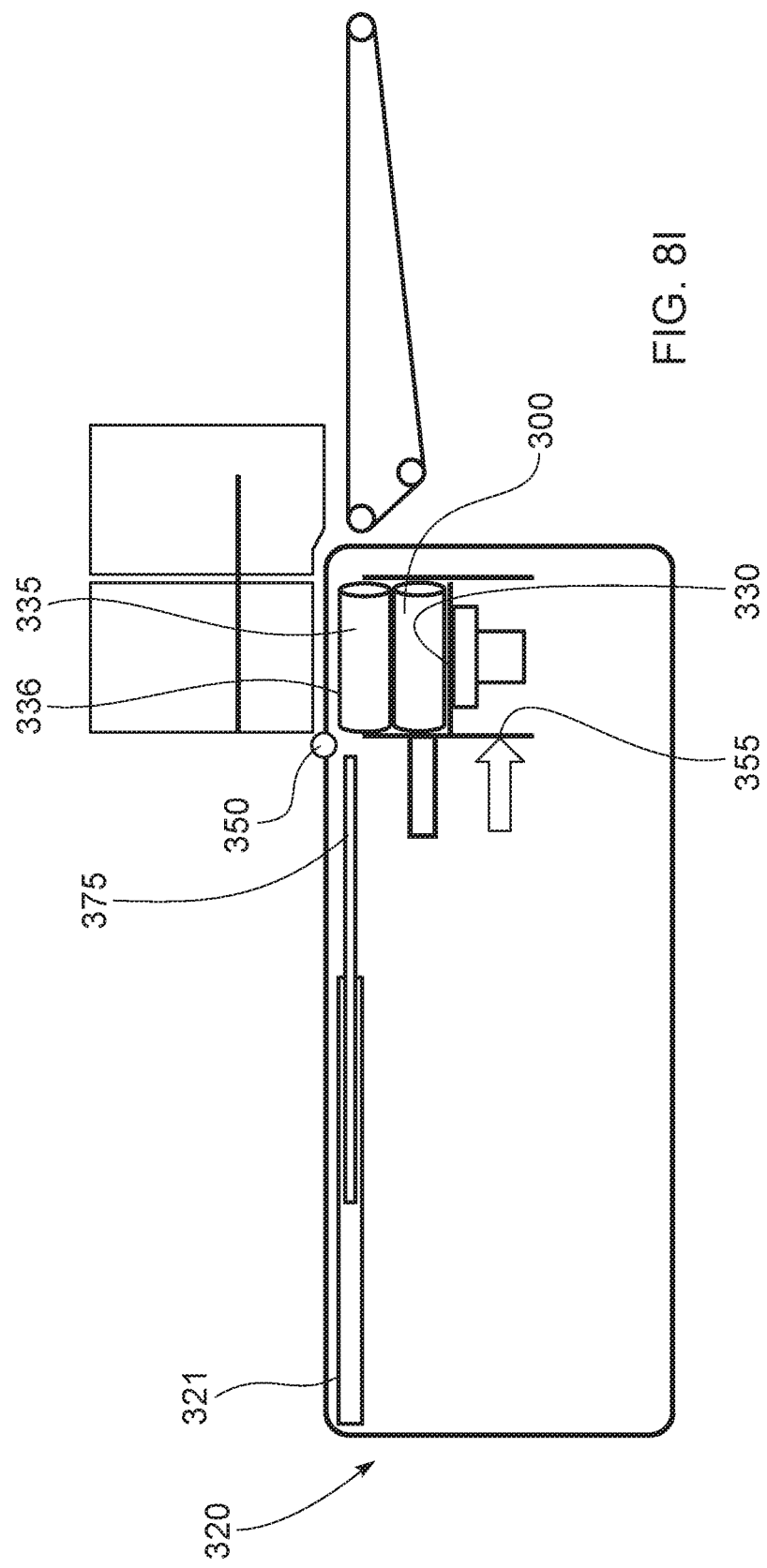

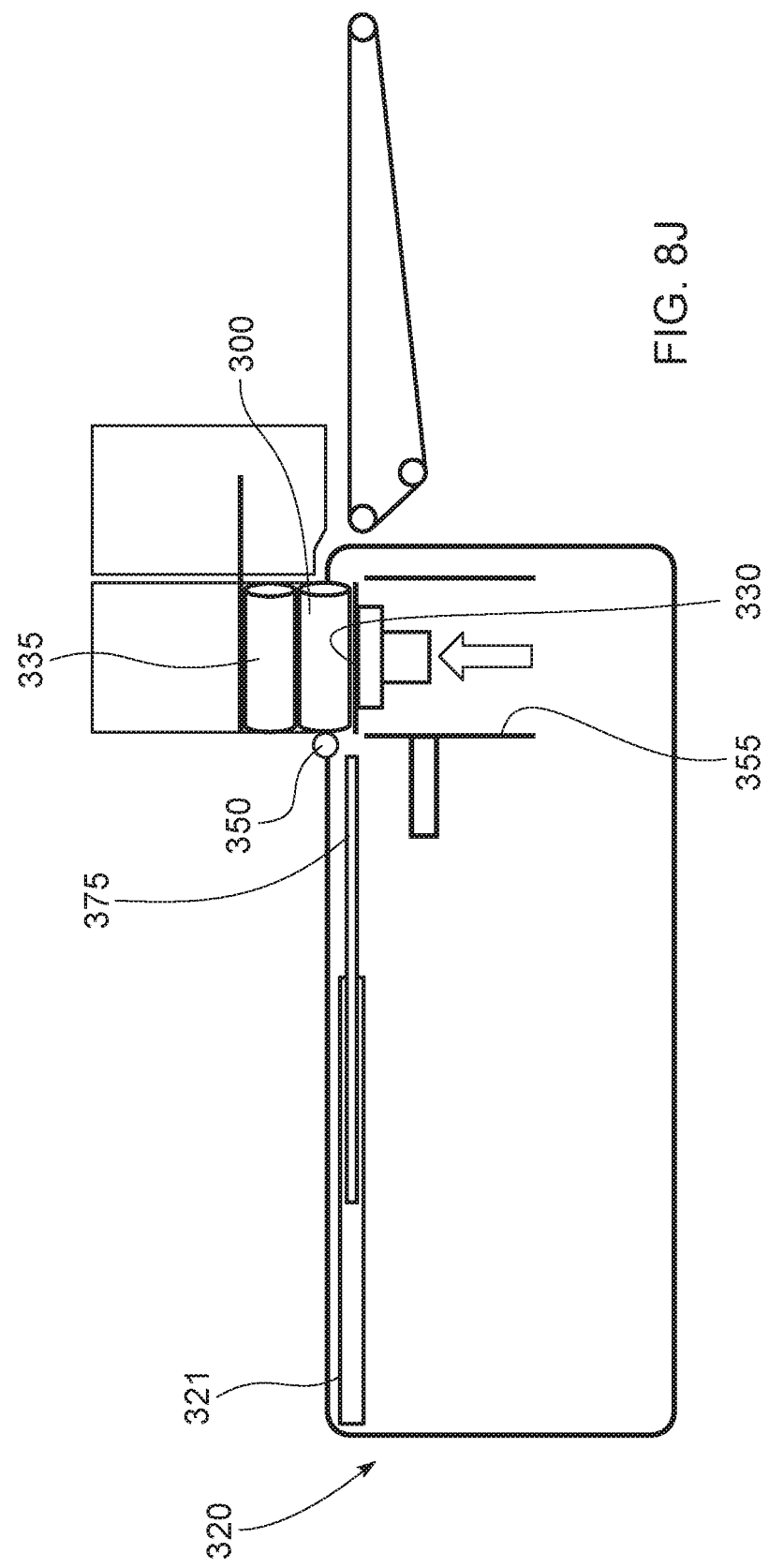

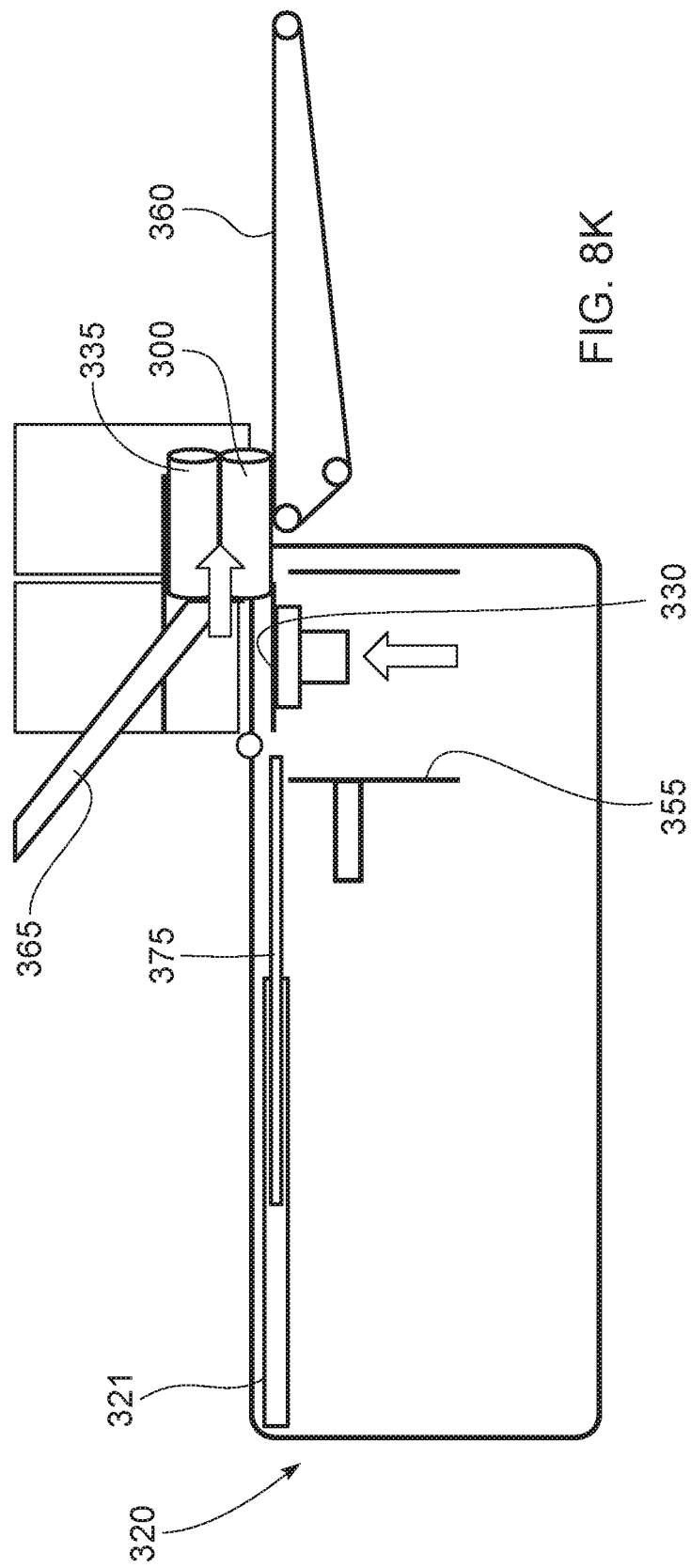

APPARATUS FOR TRANSFERRING AND/OR STACKING PRODUCTS

FIELD OF THE INVENTION

The present disclosure is related to apparatuses and methods for transferring and/or stacking products, specifically paper products, more specifically rolled sanitary tissue products such as rolled toilet paper and paper towels.

BACKGROUND OF THE INVENTION

Paper products made from absorbent fibrous webs are used for a variety of purposes. For example, rolled sanitary tissue products such as paper towels and toilet tissues are in constant use in modern industrialized societies. Such rolled products are typically packaged for retail sale in flexible polymer packaging. Such retail packages can be in the form of single rolls packaged in a polymeric film wrapper, or multiple rolls that are bundled and packaged into a larger polymeric film overwrap (with the individual rolls of the multi-roll bundle being already wrapped in individual polymeric film wrappers, or left unwrapped, before bundling into the overwrap). The retail packages that are multi-roll bundles can be formed in single-layer unit configurations, or in multi-layer stacked unit configurations, within the larger polymeric film overwrap (with the individual layers of each multi-roll bundle either being already wrapped in polymeric film wrappers, or left unwrapped, before bundling into the overwrap).

Traditional approaches to forming multi-roll retail packages of sanitary tissue products include well known "bundling" and "case packing" technologies. Generally, rolled sanitary tissue products are laned/grouped together (and optionally further stacked into layered configurations) into multi-roll bundles that are then either wrapped in a polymer overwrap, or case packed into a rigid cardboard carton.

Consumers desire that retail packages of rolled sanitary tissue products are available in many different roll counts, sizes and configurations. Packaging lines for rolled sanitary tissue products are extremely expensive, and therefore flexible packaging lines that can adjust to make a variety of packages with different roll counts, sizes and configurations are of high continued interest. Moreover, flexible packaging lines that can easily adjust to make a variety of packages with different roll counts, sizes and configurations, and have higher than traditional efficiency for one or more of the packaging options, are of even higher continued interest.

Traditional flexible packaging lines for rolled sanitary tissue products 10 include traditional flexible apparatuses for transferring and/or stacking the products, as schematically depicted in FIGS. 1-3. Such traditional apparatuses for transferring and/or stacking the products can include: a) a bar conveyor 20, b) a lifting device 30 that is separate from the bar conveyor and downstream from the bar conveyor in the transferring and/or stacking process, c) a pusher 40, and d) a loading belt 50. Traditional flexible apparatuses 10 are capable of being configured to transfer and/or stack rolled sanitary tissue products into various arrangements. However, when such a traditional apparatus is configured in a "dual unit configuration" to both transfer single-layer units of rolled sanitary tissue products (e.g., a single-layer 3 pack of paper towel rolls) and stack/transfer multi-layer stacked units of rolled sanitary tissue products (e.g., a two-layer 6 pack of paper towel rolls, i.e., two layers with 3 paper towel rolls in each layer), as schematically depicted in FIGS. 1 and 2, the process of transferring single-layer units is very inefficient. And when that traditional flexible apparatus is reconfigured to a "single-layer unit efficient configuration" that more efficiently transports the single-layer units, as schematically depicted in FIG. 3, significant reconfiguration efforts are required (e.g., equipment removal, equipment repositioning, etc.), and the apparatus is no longer capable of stacking/transferring the multi-layer stacked units. Accordingly, the traditional flexible apparatus in a single-layer unit efficient configuration can only begin to stack/transfer multi-layer stacked units again when the apparatus is reconfigured back to the dual unit configuration—again requiring significant reconfiguration efforts to the apparatus.

As illustrated in FIGS. 1 and 2, in a traditional flexible packaging line for rolled sanitary tissue products 10, when in a dual unit configuration, a flight bar 22 on bar conveyor 20 pushes one or more rolls that are grouped as a single-layer unit 12 until the unit is resting on a lifting plate 32 of lifting device 30. Because the traditional apparatus has a bar conveyor 20 that is upstream of, and separate from, lifting device 30, flight bar 22 can continue on its path, leaving unit 12 resting on the surface of lifting plate 32. At this point, if a multi-layer stacked unit 14 is desired (as depicted in FIG. 1), lifting plate 32 may be lowered and a second single-layer unit is brought in by a second flight bar and placed on top of the first single-layer unit in a stacking operation, and that stacking operation can be repeated again for a third layer; and if a single-layer unit is desired (as depicted in FIG. 2), no stacking operation is necessary. In both processes (transfer of a single-layer unit or the stack/transfer of a multi-layer stacked unit), a pusher arm 42 of pusher 40 will then push the unit 12,14 to loading belt 50. Pusher 40 is necessary to push any unit (single-layer or multi-layer) off of the surface of lifting plate 32 because lifting device 30 does not have a transferring means to advance the unit, and bar conveyor 20 is separate from, and located upstream of, the lifting device and therefore cannot be used to advance the unit to the next operation in the packaging process, loading belt 50. Loading belt 50 can then convey unit 12,14 to the next operation in the packaging process.

Pusher 40 is specifically necessary to advance a multi-layer stacked unit 14 from the surface of lifting plate 32 in a traditional flexible rolled sanitary tissue product packaging line 10 for multiple reasons. First, as detailed above, pusher 40 is necessary because lifting device 30 does not have a transferring means to advance the stacked unit 14, and bar conveyor 20 is separate from, and located upstream of, the lifting device. Thus, multi-layer stacked unit 14 cannot advance past lifting device 30 without additional equipment, e.g., pusher 40. Second, the taller profile of pusher arm 42 creates/maintains the machine direction alignment of multi-layer stacked unit 14 while being transferred from the lifting plate surface to the loading belt. If, for instance, another bar conveyor was attempted to be utilized to transfer multi-layer stacked unit 14 from the surface of lifting plate 32, the low profile of the flight bars would not maintain machine direction alignment of the stacked layers. Pusher 40 is specifically necessary to advance a single-layer unit 12 from the surface of lifting plate 32 in a traditional flexible rolled sanitary tissue product packaging line 10 because, as detailed above, lifting device 30 does not have a transferring means to advance the single-layer unit, and bar conveyor 20 is separate from, and located upstream of, the lifting device. Thus, single-layer unit 12 cannot advance past lifting device 30 without additional equipment, e.g., pusher 40.

Bar conveyor 20 is capable of transferring up to about two-hundred and fifty units 12 per minute. Pusher 40 is capable of transferring up to about sixty units 12,14 per minute. Accordingly, transferring units with bar conveyor 20 is far more efficient than transferring units with pusher 40, or transferring units with a combination of a bar conveyor and a pusher. Lifting device 30 is necessary for stacking layers of product when a traditional flexible rolled sanitary tissue product packaging line 10 is transferring/stacking multi-layer stacked units 14 (FIG. 1), but serves no purpose when the traditional flexible rolled sanitary tissue product packaging line is only transferring single-layer units 12 (FIG. 2). Accordingly, when running in a dual unit configuration (depicted in FIGS. 1 and 2), wherein the line must have lifting device 30, the single-layer units 12 are transferred slower and less efficiently due to the necessary use of pusher 40 (limited to transferring about sixty units/minute), as detailed above. To speed up the transferring process when running single-layer units 12, the traditional flexible rolled sanitary tissue product packaging line 10 may be reconfigured to remove lifting device 30 (and optionally pusher 40), and bring bar conveyor 20 into close proximity/contact with loading belt 50, thus allowing the single-layer units 12 to be transferred directly from the bar conveyor to the loading belt (at a rate of up to about two-hundred and fifty units/minute). This single-layer unit efficient configuration is shown in FIG. 3. However, reconfiguring a traditional flexible rolled sanitary tissue product packaging line 10 from a dual unit configuration (FIGS. 1 and 2) to a single-layer unit efficient configuration (FIG. 3) through removal of lifting device 30 (and optionally pusher 40) requires a significant amount of changeover effort. Moreover, when in the single-layer unit efficient configuration, the traditional flexible rolled sanitary tissue product packaging line 10 is no longer able to transfer/stack multi-layer stacked units.

Accordingly, there is continuing interest in apparatuses and methods for more efficient, cost effective, and flexible bundling and case packing of rolled sanitary tissue products. Specifically, there is continuing interest in apparatuses and methods for more efficient, cost effective, and flexible transferring and/or stacking of rolled sanitary tissue products within the overall bundling and case packing processes.

In addition, as depicted in FIGS. 1 and 2, traditional flexible rolled sanitary tissue product packaging lines 10 are only capable of maintaining downstream control over units 12 being transferred by bar conveyor 20 onto the surface of lifting plate 32. This is because bar conveyor 20 is separate from, and located upstream of, lifting device 30. Accordingly, on a traditional flexible rolled sanitary tissue product packaging line 10, as units 12 are transferred along bar conveyor 20, flight bar 22 is located downstream of each unit and maintains downstream control over the unit by pushing the unit as it's being transferred onto the surface of lifting plate 32. A flight bar is not capable of maintaining upstream control of unit 12 as it's being transferred onto the surface of lifting plate 32 because the path of flight bars 22 does not travel over the surface of lifting plate 32 (again, because the bar conveyor is separate from, and located upstream of, the lifting device).

Accordingly, there is continuing interest in apparatuses and methods for bundling and case packing of rolled sanitary tissue products, wherein upstream control of a unit is maintained for at least a portion of the packaging process. Specifically, there is continuing interest in apparatuses and methods for transferring and/or stacking of rolled sanitary tissue products within the overall bundling and case packing processes, wherein upstream control of a unit is maintained during the transferring process. Moreover, there is continuing interest in apparatuses and methods for transferring and/or stacking of rolled sanitary tissue products within the overall bundling and case packing processes, wherein both upstream and downstream control of a unit is maintained during the transferring process.

SUMMARY OF THE INVENTION

In one aspect, disclosed herein is an apparatus for transferring and/or stacking products, the apparatus including a frame, a bar conveyor associated with the frame, the bar conveyor having a plurality of flight bars that are independently driven by a plurality of independent drivetrains, a lifting device having a lifting plate, the lifting device being located within the bar conveyor, and at least one pusher.

In another aspect, disclosed herein is an apparatus for transferring and/or stacking products, the apparatus including a frame, a bar conveyor associated with the frame, the bar conveyor having a plurality of independent flight bars that are driven by a plurality of independent drivetrains, a lifting device having a lifting plate, the lifting device being located within the bar conveyor, a pair of dynamic side compression plates located adjacent the lifting device, at least one pusher, a loading belt, and a pair of static side compression plates located adjacent the loading belt.

In yet another aspect, disclosed herein is an apparatus for transferring and/or stacking products, the apparatus including a frame, a bar conveyor associated with the frame, the bar conveyor having a conveyor surface, a receiving end, a transfer end, and a plurality of independent flight bars that are driven by a plurality of independent drivetrains, a lifting device having a lifting plate having a lifting plate surface, the lifting plate being located between the receiving end of the bar conveyor and the transfer end of the bar conveyor, and at least one pusher.

BRIEF DESCRIPTION OF DRAWINGS

FIGS. 7a-j are schematic representations that include steps of a method according to one non-limiting form of the present invention disclosed herein; and FIGS. 8a-k are schematic representations that include steps of a method according to one non-limiting form of the present invention disclosed herein.

DETAILED DESCRIPTION OF THE INVENTION

Figure 1:
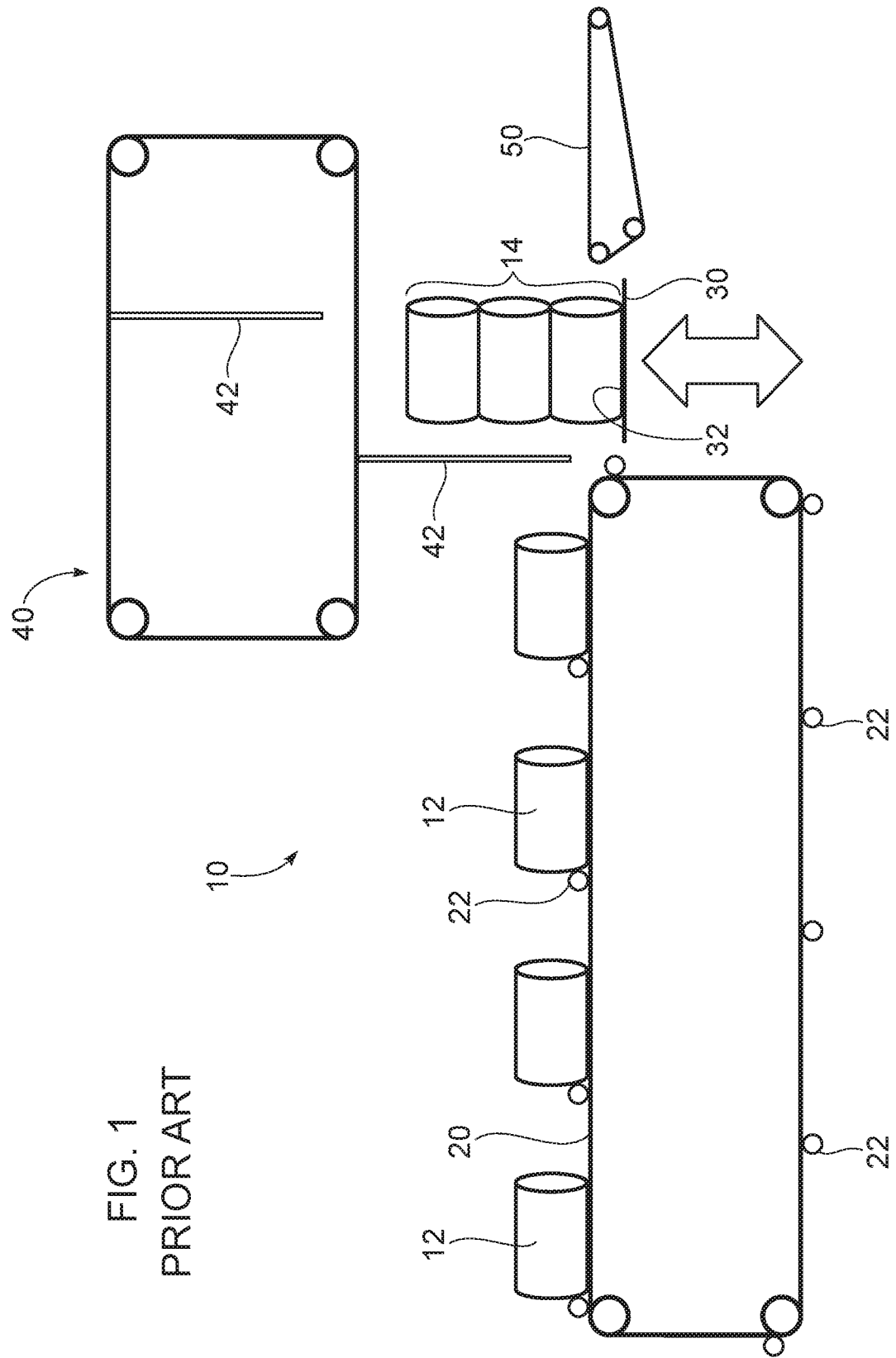
FIG. 1 is a schematic representation of a prior art, traditional flexible rolled sanitary tissue product packaging line, in a dual unit configuration, running a process for transferring/stacking multi-layer stacked units.
Figure 2:
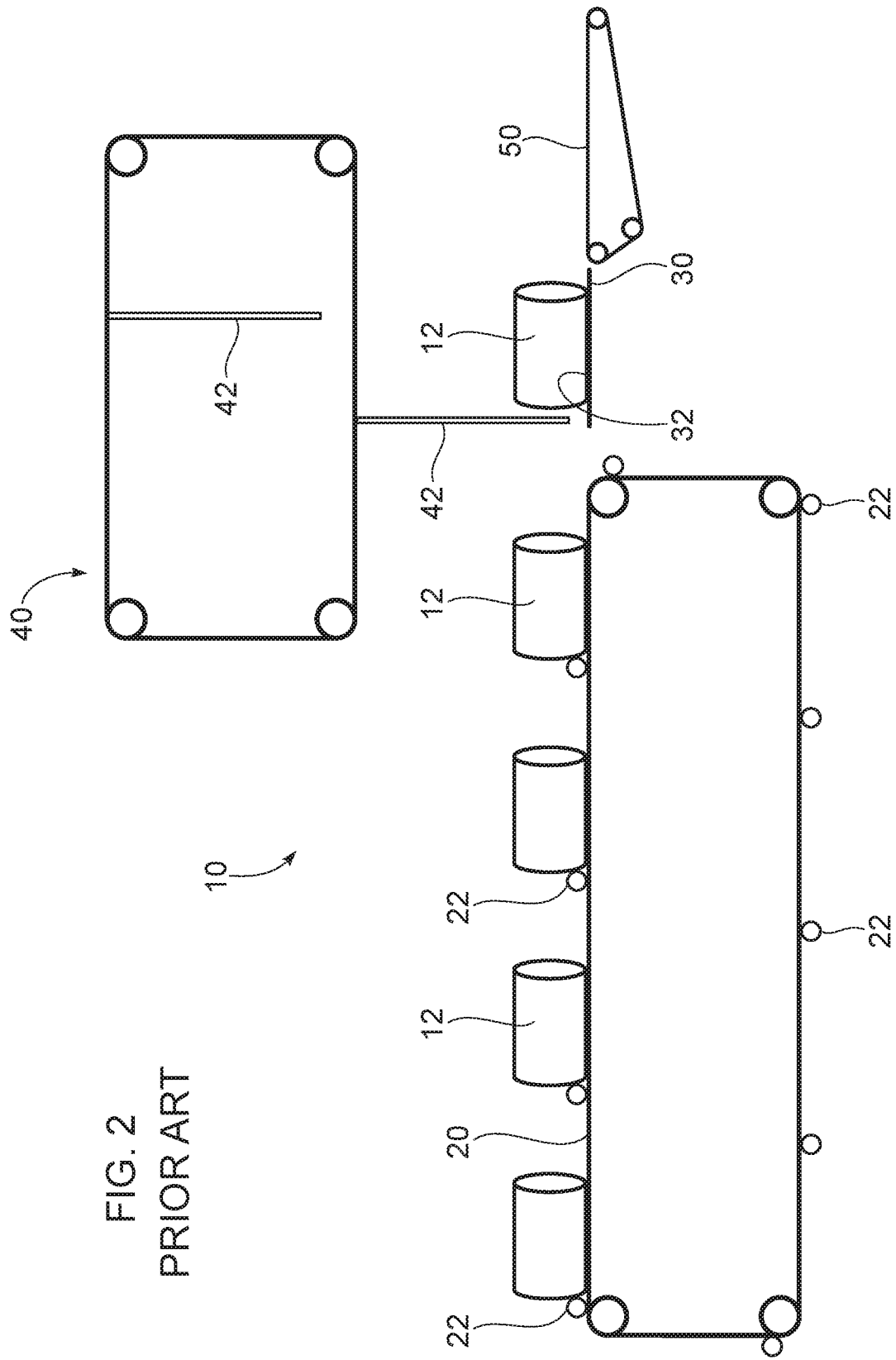
FIG. 2 is a schematic representation of a prior art, traditional flexible rolled sanitary tissue product packaging line, in a dual unit configuration, running a process for transferring single-layer units.
Figure 3:
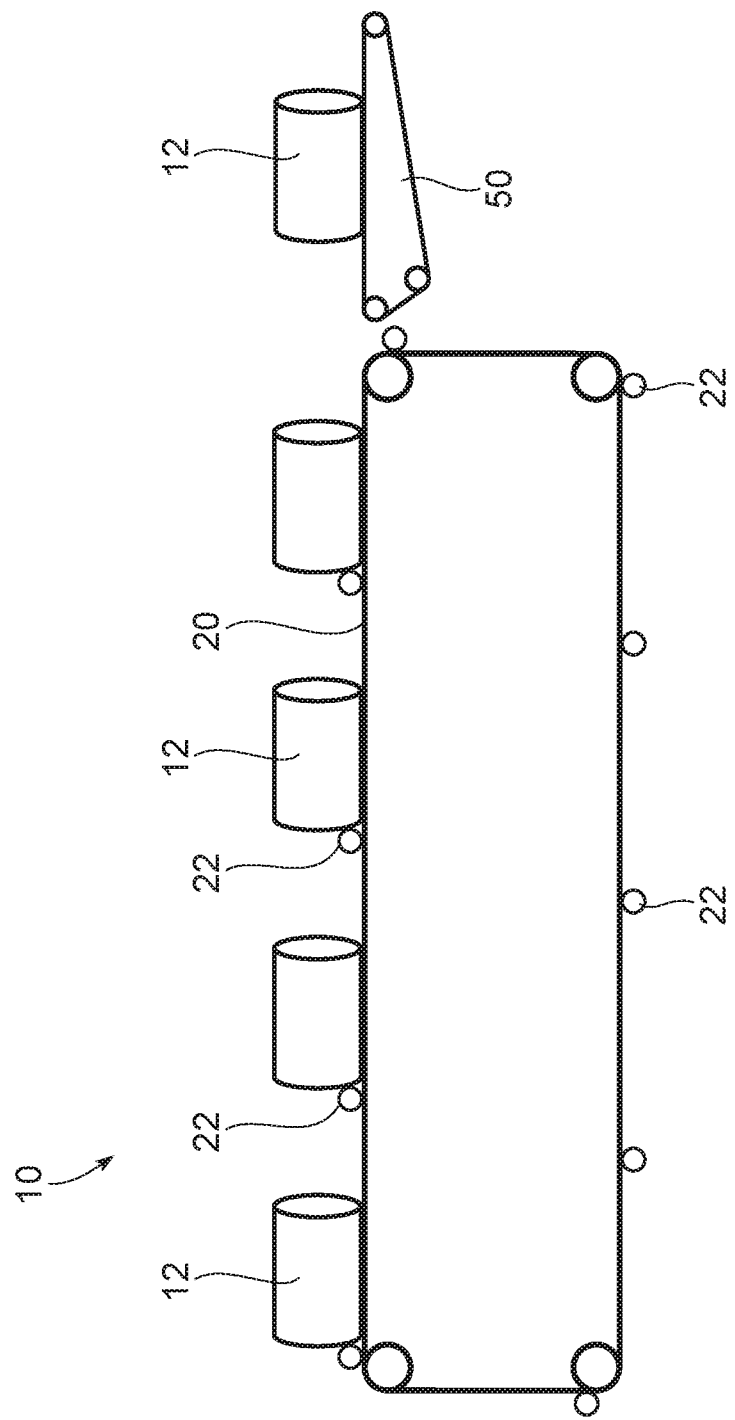
FIG. 3 is a schematic representation of a prior art, traditional flexible rolled sanitary tissue product packaging line, in a single-layer unit efficient configuration, running a process for transferring single-layer units.

Definitions:

"Above", "over", "higher", "below", "under" and "lower" and similar words and phrases relating to orientation as used herein to describe embodiments are to be construed relative to the normal orientation, where articles expressed as being above, over, higher and the like are located elevationally closer to the sky than the items to which they are being compared. Similarly, articles expressed as being below, beneath or under and the like are located elevationally further from the sky than their respective comparators.

"Fibrous structure" as used herein means a structure that comprises one or more fibrous elements. In one example, a fibrous structure according to the present invention means an association of fibrous elements that together form a structure capable of performing a function. Non-limiting examples of fibrous structures of the present invention include paper (such as a sanitary tissue product) and fabrics (including woven, knitted, and non-woven).

"Sanitary tissue product" as used herein means a soft, relatively low density fibrous structure useful as a wiping implement for post-urinary and post-bowel movement cleaning (toilet tissue), for otorhinolaryngological discharges (facial tissue), multi-functional absorbent and cleaning uses (paper towels) and wipes, such as wet and dry wipes. The sanitary tissue product may be convolutely wound upon itself about a core or without a core to form a sanitary tissue product roll or the sanitary tissue product may be in the form of discrete sheets. The sanitary tissue product can be single-ply or multi-ply.

"Machine Direction" or "MD" as used herein means the direction of the flow of a product through the product making machine and/or manufacturing equipment (such as transferring or stacking equipment, or generally, packaging line equipment).

"Cross Machine Direction" or "CD" means the direction perpendicular to the machine direction.

"Reverse Machine Direction" or "RMD" means the direction parallel to and opposite of the machine direction.

Overview:

The disclosure herein is directed to improvements over traditional bundling and case packing apparatuses and methods for sanitary tissue products, and in particular, improvements over the traditional transferring and stacking portions of bundling and case packing apparatuses and methods for sanitary tissue products. In addition to other aspects further detailed below, the inventive flexible apparatuses described herein may generally include: a) a bar conveyor with an associated frame, wherein the bar conveyor has an integral lifting device, and b) at least one pusher. In general, an independent flight bar on the bar conveyor can push one or more sanitary tissue products that are laned/grouped as a single-layer unit until the unit is resting in a position over a lifting plate of the integral lifting device in a stacking operation, or can push the single-layer unit past the lifting plate of the integral lifting device in a non-stacking operation. If the independent flight bar pushes the single-layer unit past the lifting plate in a non-stacking operation, the independent flight bar will continue to push the unit until the unit reaches the next operation in the packaging process, e.g., a loading belt, a former, etc. If the independent flight bar pushes the single-layer unit until resting over the lifting plate of the integral lifting device in a stacking operation (e.g., stacking single-layer units on top of one another to form a multi-layer stacked unit), the independent flight bar will stop just short of the lifting plate. After the stacking operation, a pusher will push the multi-layer stacked unit until the stacked unit reaches the next operation in the packaging process, i.e., a loading belt, a former, etc. The single-layer unit or multi-layer stacked unit may then continue to the next operation in the overall packaging line. Accordingly, as will be further detailed below, the inventive flexible apparatuses (and associated methods) described herein provide the capability to transfer and then stack the multi-layer stacked units, as well as the capability to more efficiently transfer the single-layer units, without the need for significant reconfiguration efforts in switching the flexible apparatuses from processing multi-layer stacked units to single-layer units.

The bar conveyor of the inventive flexible apparatuses described herein is capable of transferring up to about two-hundred and fifty units per minute. The pusher of the inventive flexible apparatuses described herein is capable of transferring up to about sixty units per minute. Accordingly, as further detailed below, the inventive flexible apparatuses described herein can transfer single-layer units through utilization of independent flight bars (no need to use pusher) to the next step in the packaging process at a rate of up to about two-hundred and fifty units per minute when the apparatuses are in a dual unit configuration (i.e., capable of running both single-layer units and multi-layer stacked units). Thus, when desiring to run single-layer units, the inventive flexible apparatuses as detailed herein provide: 1) the efficiency of the traditional flexible apparatuses running in a single-layer unit efficient configuration, and 2) the elimination of significant reconfiguration efforts that were necessary for the traditional flexible apparatuses to reconfigure from a dual unit configuration to a single-layer unit efficient configuration (as described in the Background section above). In other words, the inventive flexible apparatuses detailed herein only need to operate in a dual unit configuration, and do so while transferring single-layer units at the efficiency of traditional flexible apparatuses that are set up in a single-layer unit efficiency configuration.

Figure 4:
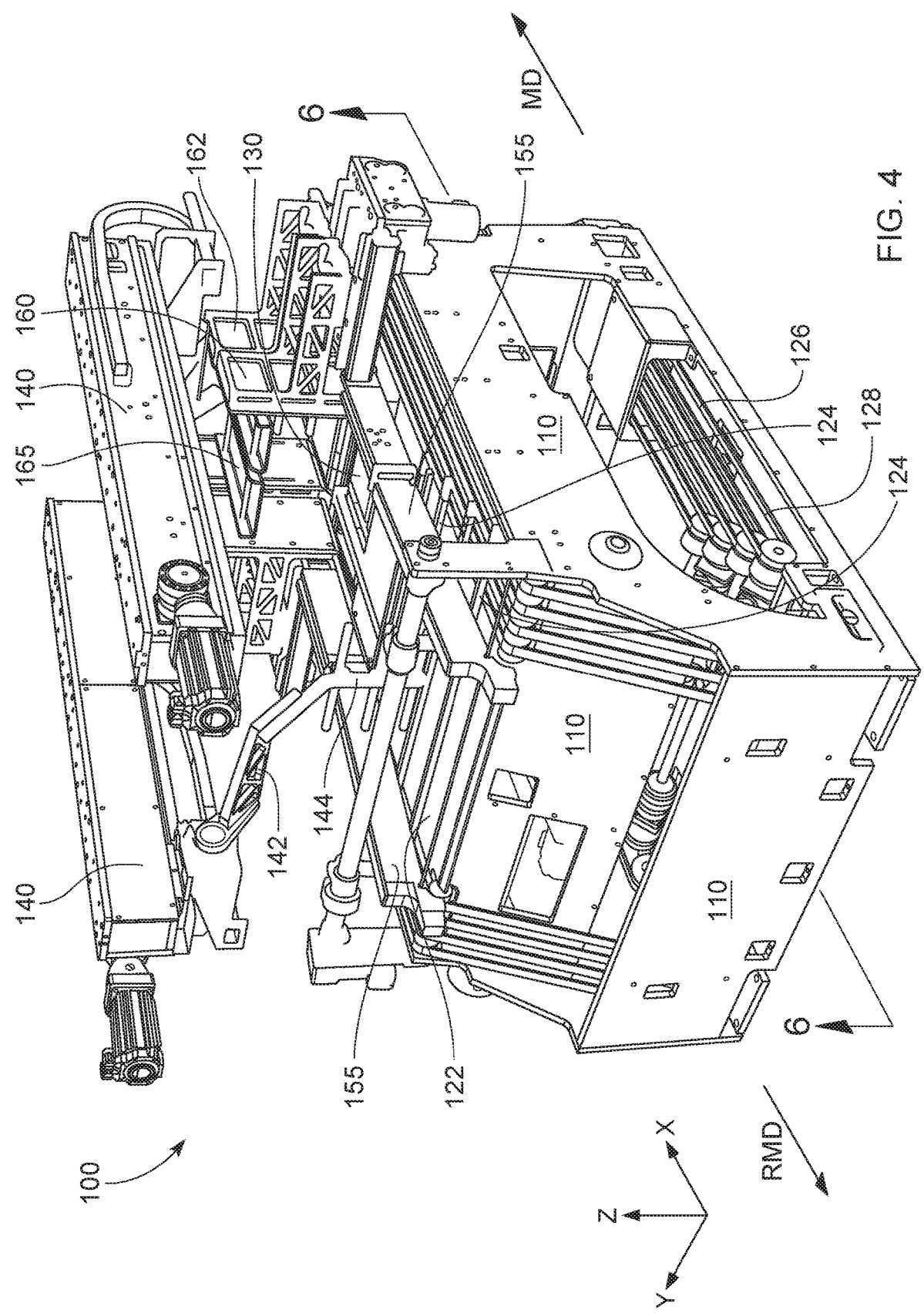
FIG. 4 is a perspective view of an apparatus according to one non-limiting form of the present invention disclosed herein.
Figure 5:
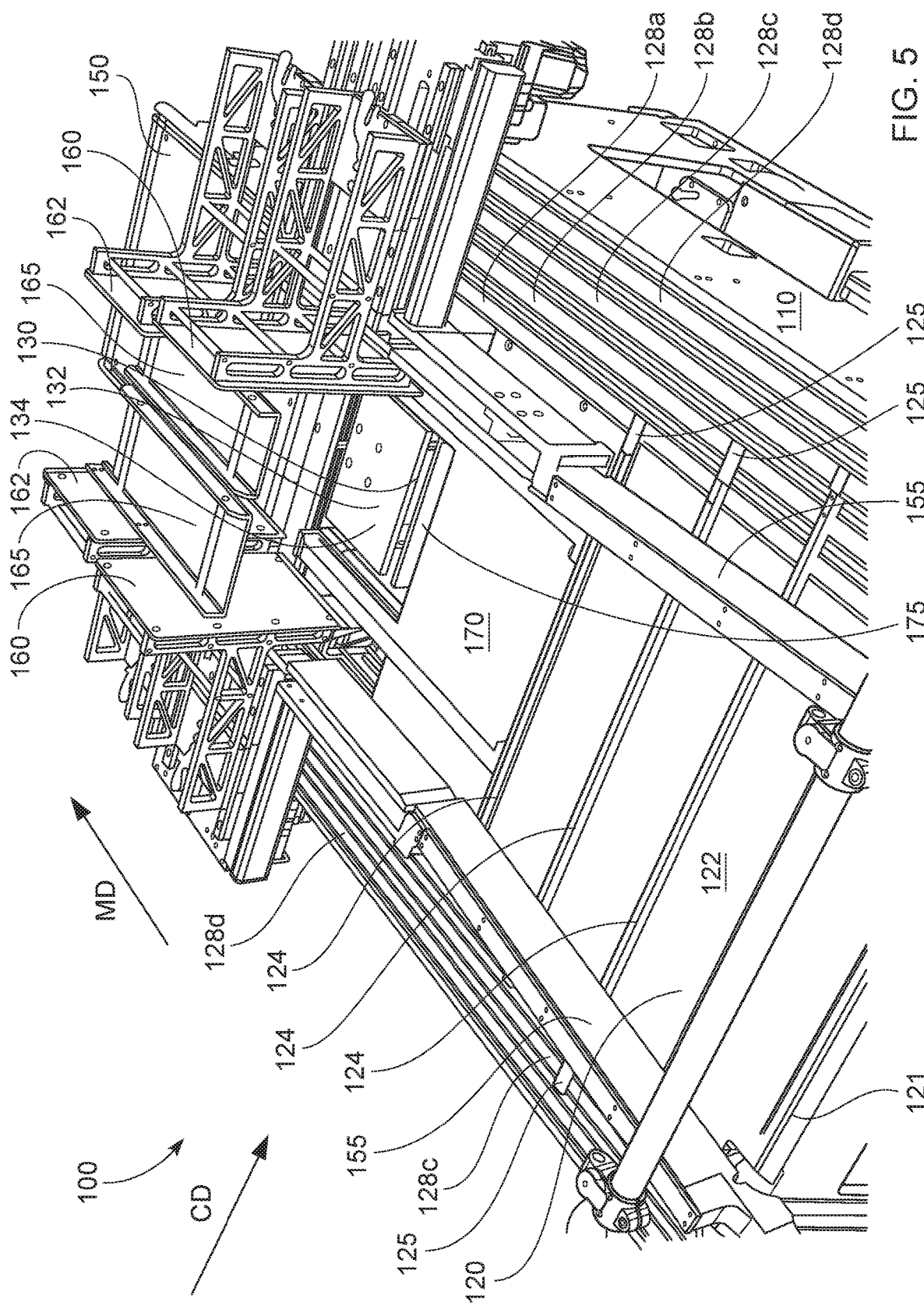
FIG. 5 is another perspective view of the apparatus illustrated in FIG. 4, with the pushers removed.
Figure 6:
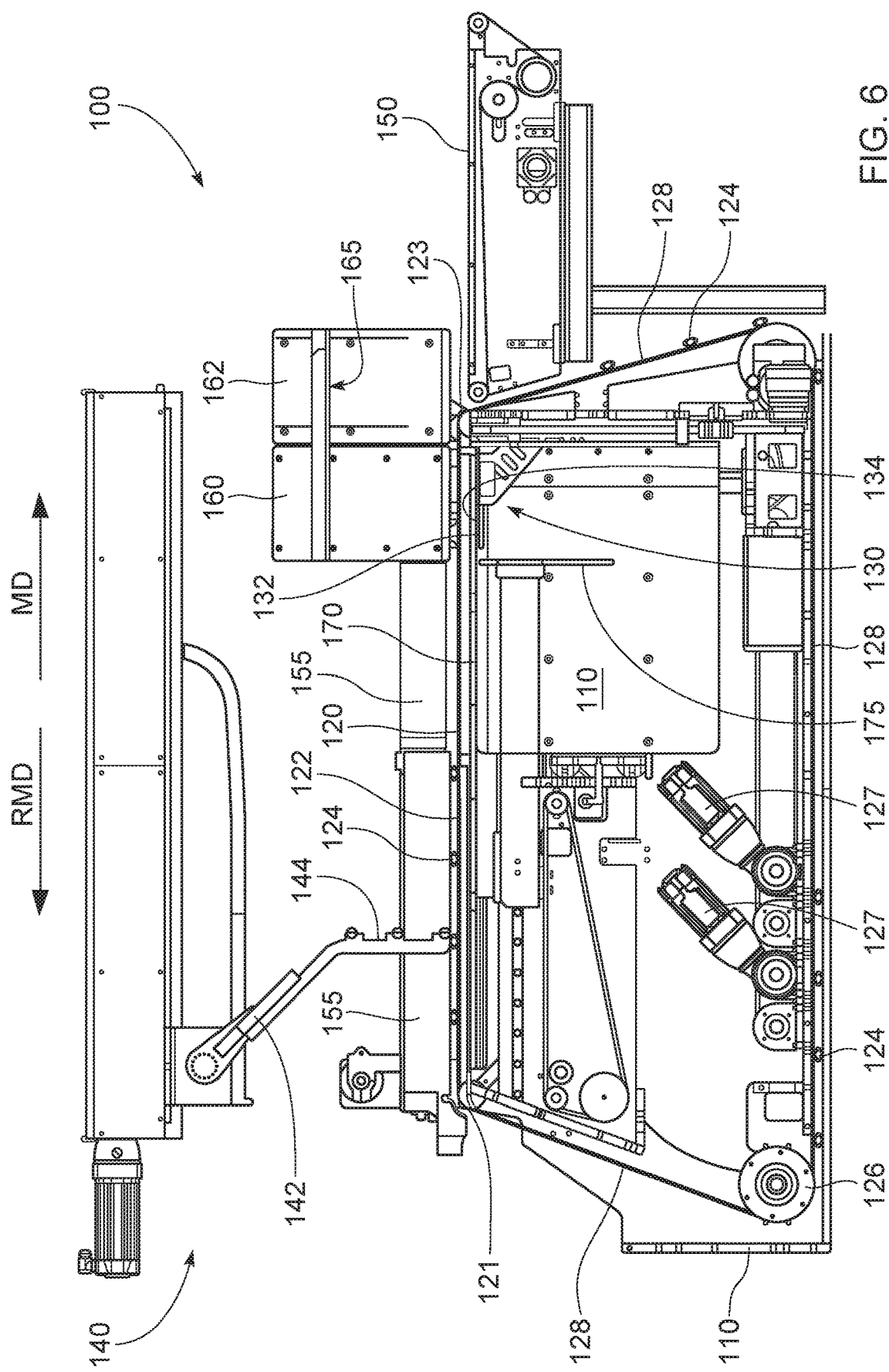
FIG. 6 is a cross-sectional view of the apparatus illustrated in FIG. 4, taken along line 6-6, the centerline of the apparatus in the machine direction.

Apparatus:

As stated above, and illustrated in FIGS. 4-6, the inventive apparatuses for transferring/stacking sanitary tissue products 100 described herein may include a frame 110 with associated bar conveyor 120, wherein the bar conveyor has an integral lifting device 130, and at least one pusher. Frame 110 may be made partially, or entirely, of metal and/or plastic, and may take any shape or form that supports the components of apparatus 100. In one form, frame 110 is constructed of entirely of metal, such as for example, aluminum plate, more specifically, 20 mm thick aluminum plate. In the form illustrated in FIGS. 4-6, frame 110 is located both outside and inside of bar conveyor 120 and provides support for the bar conveyor, as well as additional components of apparatus 100, as detailed herein.

Bar conveyor 120 may include a static conveyor surface 122, a plurality of flight bars 124, and a plurality of independent drivetrains 126 that drive the plurality of flight bars. Bar conveyor 120 may have a receiving end 121 and a transfer end 123 on the top of the bar conveyor (where product is conveyed). In operation, product (e.g., rolled sanitary paper products) may travel along bar conveyor 120 in the machine direction, wherein receiving end 121 is the end of the bar conveyor in which product enters the bar conveyor, and transfer end 123 is the end of the bar conveyor in which product exits the bar conveyor. Accordingly, receiving end 121 and transfer end 123 are located at the top of bar conveyor 120 on opposite ends of the bar conveyor, separated by a distance in the machine direction. The location of receiving end 121 and transfer end 123 are most clearly seen in the cross-sectional view of FIG. 6. As further detailed below, in the inventive apparatuses for transferring/stacking sanitary tissue products 100 described herein, lifting device 130 is integral to bar conveyor 120, and therefore the lifting device is located within the bar conveyor, i.e., between receiving end 121 of the bar conveyor and transfer end 123 of the bar conveyor.

In the non-limiting form illustrated in FIGS. 4-6, bar conveyor 120 includes four independent drivetrains 126, and three flight bars 124 per independent drivetrain 126. Accordingly, apparatus 100, as depicted in FIGS. 4-6, includes twelve total flight bars 124, which are driven and controlled in four independent groups of three. In other words, each independent drivetrain 126 drives it's three flight bars 124 together as a group, and that group of three flight bars is driven independently of the movement of the other nine flight bars on the bar conveyor. In other forms, apparatus 100 may include two, three, four, five, six, seven, eight, nine, ten or more independent drivetrains. Moreover, in other forms, each independent drivetrain 126 of apparatus 100 may drive one, two, three, four, five, six, seven, eight, nine, ten, eleven, twelve, thirteen, fourteen, fifteen or more flight bars as a group. In some forms, flight bars 124 are straight and elongated in the cross machine direction, and are long enough to go across at least a portion, or entirely across, the lane of bar conveyor 120 (i.e., area between the side guides, as detailed below) that the sanitary tissue products are being transferred along. In other forms, flight bars 124 may be curved or angled. Each independent drivetrain 126 may include one or more servos 127 (i.e., "servomechanism motor" or "servo motor") and one or more belts 128. Servo 127 may be selected from any servomechanism motor known in the packaging equipment art, including DC motors and AC motors. Belt 128 may be selected from any types of belts known in the art of packaging equipment, such as belts made from plastic, fabric, rubber, or combinations thereof.

In the non-limiting form illustrated in FIGS. 4-6, each independent drivetrain 126 includes one servo 127 that drives a pair of belts 128. For each independent drivetrain 126, servo 127 is connected to and the drives the pair of belts 128 along their defined paths in a machine direction and a reverse machine direction. The pair of belts 128 of each independent drivetrain 126 are located on opposite sides of static bar conveyor surface 122, with the belts being separated by a distance in the cross machine direction. In the non-limiting illustrated form, the pairs of belts of each independent drivetrain are located concentrically outward from each other in the cross machine direction. Accordingly, a first pair of belts 128a of a first independent drivetrain are located at a distance apart from each other in the cross machine direction. A second pair of belts 128b of a second independent drivetrain are both located distally outward in a cross machine direction (i.e., further away from a center line running in the machine direction of bar conveyor 120) from the belts of the first independent drivetrain. A third pair of belts 128c of a third independent drivetrain are both located distally outward in a cross machine direction from the belts of the second independent drivetrain. A fourth pair of belts 128d of a fourth independent drivetrain are both located distally outward in a cross machine direction from the belts of the third independent drivetrain. The two belts 128 of each of the four drivetrains 126 are connected by three flight bars 124. Each flight bar 124 has two distal ends 125, and the flight bar connects at a first distal end to a first belt of an independent drivetrain, and at a second distal end to a second belt of the same independent drivetrain. And because the belts of the independent drivetrains are different distances apart in the cross machine direction, the length of the flight bars will also be different for each independent drivetrain. Flight bars 124 connected to the same independent drivetrain will be the same length. In the non-limiting example depicted in FIGS. 4-6, there are twelve flight bars total, in four groups of three (three flight bars for each of the four independent drivetrains), and the cross machine directional length of the first group of three flight bars associated with the first independent drivetrain 128a will be shorter than the cross machine directional length of the second group of three flight bars associated with the second independent drivetrain 128b, and the cross machine directional length of that second group of three flight bars will be shorter than the cross machine directional length of the third group of three flight bars associated with the third independent drivetrain 128c, and the cross machine directional length of that third group of three flight bars will be shorter than the cross machine directional length of the fourth group of three flight bars associated with the fourth independent drivetrain 128d.

The three flight bars of each group run together with one another, as the flight bars in each group are controlled by the same independent drivetrain. The attachment position of the flight bars of each group will be spread out along the path of the belt of the associated drivetrain. In reference to the sequence of flight bars 124 on the overall bar conveyor 120, the flight bars may alternate on a group basis. For instance, the flight bar sequence of the non-limiting bar conveyor 120 illustrated in FIGS. 4-6 follows: a first flight bar from the first group of three associated with first independent drivetrain (including belts 128a), followed by a first flight bar from the second group of three associated with second independent drivetrain (including belts 128b), followed by a first flight bar from the third group of three associated with third independent drivetrain (including belts 128c), followed by a first flight bar from the fourth group of three associated with fourth independent drivetrain (including belts 128d), followed by a second flight bar from the first group of three associated with first independent drivetrain, followed by a second flight bar from the second group of three associated with second independent drivetrain, followed by a second flight bar from the third group of three associated with third independent drivetrain, followed by a second flight bar from the fourth group of three associated with fourth independent drivetrain, followed by a third flight bar from the first group of three associated with first independent drivetrain, followed by a third flight bar from the second group of three associated with second independent drivetrain, followed by a third flight bar from the third group of three associated with third independent drivetrain, and followed by a third flight bar from the fourth group of three associated with fourth independent drivetrain. Other sequences and arrangements are also possible based on the desired operational processes of bar conveyor 120.

In use, the non-limiting bar conveyor 120 illustrated in FIGS. 4-6 may operate in the following manner. For each of the individual four drivetrains 126, the servo 127, controlled by a computer running an electronic motion profile, drives the pair of belts 128 together. The three flight bars 124 in each group, which are each attached to both belts of the independent drivetrain that drives that particular group, move together with the pair of belts. If the belts are driven by the servo in a machine direction (as observed from above of the bar conveyor, looking down on the observable portion of the belt on top of bar conveyor surface 122), the three flight bars in the group are driven in a machine direction (as observed from above the bar conveyor, looking down on the observable flight bar on top of bar conveyor surface 122); if the belts are stopped, the three flight bars in the group are stopped; and if the belts are driven by the servo in a reverse machine direction, the three flight bars in the group are driven in a reverse machine direction. Independent drivetrains 126 may operate in sync with one another, all driven in a coordinated manner by a computer running an electronic motion profile.

The apparatuses for transferring/stacking sanitary tissue products 100 described herein include a lifting device 130 that is integral to bar conveyor 120. Accordingly, lifting device 130 is located between receiving end 121 of bar conveyor 120 and transfer end 123 of the bar conveyor. Thus, the path of flight bars 124 on bar conveyor 120 travels before, over and beyond lifting device 130, and therefore single-layer product units are able to be conveyed over the lifting device when apparatus is still in a dual unit configuration. This may be observed in FIGS. 4-6, but the location of lifting device 130 inside of the path of belts 128 and flight bars 124 of bar conveyor 120 may be most clearly observed in the FIG. 6 cross sectional view of apparatus 100.

Lifting device 130 may include a lifting plate 132 that has a lifting plate surface 134. Lifting plate surface 134 may be the flat surface of the top of lifting plate 132. Lifting plate 132 may be driven vertically, or substantially vertically, up and down by a servo (not illustrated) of lifting device 130. The servo may be selected from any servomechanism motor known in the packaging equipment art, including DC motors and AC motors.

Lifting plate 132 may be positioned at various heights depending on the desired operation of apparatus 100. In a first position, lifting plate surface 134 may be in the same plane, or substantially the same plane, with conveyor surface 122—this may also be referred to as the transferring position of the lifting plate surface because this is the position of lifting plate when apparatus 100 is running single-layer units in a dual unit configuration. Thus, in that first position, lifting plate surface 134 is even with conveyor surface 122 and may function as a continuation of the conveyor surface. Depending on the desired operation of apparatus 100, lifting plate surface 134 may be raised and/or lowered from the first position by the servo of lifting device 130. If lifting plate surface 134 is lowered (for example, in a stacking operation), it can be lowered to a second position that aligns the top surface of a unit of product resting on the lifting plate surface to be in the same plane, or substantially the same plane, with conveyor surface 122. Accordingly, the positions of lifting plate surface 134 may be dependent on the size/height of the unit of products. Further, lifting plate surface 134 may be lowered as many times as needed to produce the desired stacked unit of products (and thus be placed in a lower third position, a lower fourth position, a lower fifth position, etc.).

The apparatuses for transferring/stacking sanitary tissue products 100 described herein include at least one pusher 140. In the non-limiting illustrated form of FIGS. 4-6, a pair of pushers 140 are utilized in tandem, although other forms of apparatus 100 may include just one pusher; or three, four, five, or six pushers. Pusher 140 operates to push the stacked units of product off lifting plate surface 134, and onto the next operation in the packaging line. In the non-limiting form illustrated in FIGS. 4-6, each of such pushers 140 includes a pusher arm 142 and a pusher hand 144. Pusher arm 142 and pusher hand 144 ride along a linear rail above bar conveyor 120 and lifting device 130, driven by a servo. The servo may be selected from any servomechanism motor known in the packaging equipment art, including DC motors and AC motors. The servo may drive the pusher arm 142 and pusher hand 144 in a constant or variable speed.

Pusher arm 142 may rotate down and up in the X and Z directions, but other forms of pusher 140 may have arms that do not rotate. In pusher(s) 140 that rotate, the rotation is driven by a servo. The servo may be selected from any servomechanism motor known in the packaging equipment art, including DC motors and AC motors. Pusher hand 144 may rotate from pusher arm 142 as well, or may remain locked in position. If pusher hand 144 is rotatable on pusher arm 142, the rotation may be made through utilization of a servo. The length of pusher arm 142 and/or the height of pusher hand 144 are adjustable, and determined by the height of the desired multi-layer stacked unit of product.

The apparatuses for transferring/stacking sanitary tissue products 100 described herein may include optional loading belt 150. As detailed above, when the stacked units of product are pushed off of lifting plate surface 134, pusher 140 pushes the units to the next step in the packaging operation. This next component of apparatus 100 may be loading belt 150, which can be any conveyor belt known in the packaging equipment art. Loading belt 150 can then convey the product to the next step in the packaging operation, which may be a former, etc.

The apparatuses for transferring/stacking sanitary tissue products 100 described herein may include optional side guides 155. Side guides 155 may be useful in funneling the product into the desired position within the lane of bar conveyor 120. Side guides 155 may be of a height sufficient to keep the desired units of product contained in the lane of bar conveyor 120. Side guides 155 may be adjustable for different sized products, and may be made of plastic or metal. In apparatuses 100 that include side guides 155, the side guides may define the width and shape of the lane of bar conveyor 120.

The apparatuses for transferring/stacking sanitary tissue products 100 described herein may include optional side compression plates. The side compression plates may include one or more dynamic compression plates 160 and/or one or more static compression plates 162. In the form illustrated in FIGS. 4-6, apparatus 100 includes a pair of dynamic compression plates 160 and a pair of static compression plates 162. Dynamic compression plates 160 may be driven forward and backward in a cross machine direction by a servo, and the servo may be controlled by a computer running an electronic motion profile. The servo may be selected from any servomechanism motor known in the packaging equipment art, including DC motors and AC motors. The compression/alignment of the units of product implemented by the side compression plates may be in the Y direction (i.e., cross-machine direction). The travel distance of dynamic compression plates 160 in a cross machine direction may be adjustable, and adjustments may be made based on the size/shape/configuration of the units being processed.

Dynamic compression plates 160 operate to compress/align the units of product (single layer unit or multi-layer stacked unit). Dynamic compression plates 160 may be located above bar conveyor 120 and adjacent lifting device 130, so that when the multi-layer stacked unit is raised up (lifting plate surface 134 is in the same plane as conveyor surface 122, i.e., in a first position), the dynamic compression plates compress the unit immediately before pusher 140 pushes the multi-layer stacked unit off of the lifting plate surface and onto the next step in the packaging operation, e.g., onto loading belt 150. Dynamic compression plates may still operate as described above when running either single-layer units or multi-layer stacked units through apparatus 100, or may be turned off, and/or maintained in a static position for running single-layer units.

In forms of apparatus 100 that include static compression plates 162, such plates may be located directly downstream of dynamic compression plates 160. Static compression plates 162 may also be located above optional loading belt 150 and above transfer end 123 of bar conveyor 120. After dynamic compression plates 160 compress the unit, pusher 140 pushes the unit off lifting plate surface 134 and between static compression plates 162. Static compression plates 162 maintain the compression implemented to the unit by the dynamic compress plates while the unit travels to the next operation in the packaging line, e.g., loading belt 150.

The apparatuses for transferring/stacking sanitary tissue products 100 described herein may include optional top compression plate(s) 165. Top compression plate 165 may be one or more plates that are static or dynamic and operate to compress the units of product in a Z direction (i.e., perpendicular to both the machine direction and the cross machine direction). In the form as illustrated in FIGS. 4-6, top compression plates 165 are located above the lifting device area within bar conveyor 120, and above optional loading belt 150, in the same area as optional dynamic and static compression plates 160,162. As lifting plate surface 134 is raised to elevate a multi-layer stacked unit, the stacked unit is pressed against top compression plate 165 and slightly compressed in the Z direction before pusher 140 pushes the unit off the lifting plate surface and onto the next operation in the packaging line, e.g., loading belt 150. In other forms, top compression plate 165 may be dynamic. In such forms, top compression plate may be driven by a servo, and the servo may be controlled by a computer running an electronic motion profile. The servo may be selected from any servomechanism motor known in the packaging equipment art, including DC motors and AC motors.

The apparatuses for transferring/stacking sanitary tissue products 100 described herein may include optional moving plate 170. Moving plate 170 is a flat, dynamic plate that may be driven by a servo, and the servo may be controlled by a computer running an electronic motion profile. The servo may be selected from any servomechanism motor known in the packaging equipment art, including DC motors and AC motors. In apparatuses 100 that include moving plate 170, it is located adjacent to, and slightly above, lifting device 130, and travels in machine direction and reverse machine directions. The objective of optional moving plate 170 is to better control the placement of the single-layer units when layering them on top of one another in a stacking operation. Moving plate 170 may travel forward with a single-layer unit resting on the moving plate, and when the unit is in the proper positioning over another unit that is resting on lifting plate surface 134 (or resting on another unit, depending on desired multi-layer stacked unit), the moving plate quickly accelerates in a reverse machine direction, allowing the unit to drop in a controlled manner onto the unit below it in the multi-layer stacked unit. When moving in a reverse machine direction, moving plate 170 travels slightly below the conveyor surface 122 in order to avoid interaction with flight bars 124 of bar conveyor 120.

The apparatuses for transferring/stacking sanitary tissue products 100 described herein may include optional dynamic alignment plate 175. Dynamic alignment plate 175 may be driven in a machine direction and reverse machine direction by a servo, and the servo may be controlled by a computer running an electronic motion profile. The servo may be selected from any servomechanism motor known in the packaging equipment art, including DC motors and AC motors. Dynamic alignment plate 175 may operate to align the multi-layer stacked units of product. The alignment of the multi-layered stacked units of product may be in the X direction (i.e., machine direction). Dynamic alignment plate 175 may be located adjacent lifting device 130, so that when the multi-layer stacked unit is lowered by the lifting device (lifting plate surface 134 is in a plane below the plane in which conveyor surface 122 sits, i.e., a second, third, fourth position, etc.), the alignment plate aligns the multi-layer stacked unit before the lifting device raises the aligned stacked unit up to be pushed off of the lifting plate surface by pusher 140. The travel distance of dynamic alignment plate 175 in a machine/reverse machine direction may be adjustable, and adjustments may be made based on the size of the desired multi-layered stack. Non-limiting forms of optional dynamic alignment plate 175 may be observed in FIGS. 4-6, but its location and configuration may be most clearly observed in the FIG. 6 cross sectional view of apparatus 100.

Method:

As detailed above, the inventive flexible apparatuses (and associated methods) described herein provide the capability to transfer and stack multi-layer stacked units, as well as the capability to more efficiently transfer the single-layer units, without the need for significant reconfiguration efforts in switching the flexible apparatus from processing multi-layer stacked units to single-layer units.

Further, the methods detailed below provide the capability to transfer and stack rolled sanitary tissue products, wherein upstream control of a unit is maintained for at least a portion of the process, e.g., when the unit is being transferred onto the surface of a lifting plate. The methods detailed below also provide the capability to transfer and stack rolled sanitary tissue products, wherein a combination of downstream and upstream control of a unit is maintained for at least a portion of the process, e.g., when the unit is being transferred onto the surface of a lifting plate. This upstream control, or combination of upstream and downstream control, provides the ability to better control the units during transfer and stacking. Accordingly, this allows for a process that more effectively, more efficiently, and/or more repeatedly makes tighter and better aligned bundles of sanitary tissue products.

In one non-limiting form of a method of transferring single-layer units of product, the method may include the following steps: a) providing a first plurality of products as a first unit on a conveyor surface, wherein the first unit has a first trailing end; and b) pushing the first unit in a machine direction on the conveyor surface with a first independent flight bar, the first independent flight bar in contact with the first trailing end of the first unit. The first independent flight bar can push the single-layer unit across the lifting plate surface and continue to push the unit until the unit reaches the next operation in the packaging process, e.g., a loading belt, a former, etc. In pushing the single-layer unit from behind with the flight bar (contacting the first trailing end), the method maintains downstream control over the unit.

In one non-limiting form of a method of stacking a two-layer stacked unit, the method may include the following steps: a) providing a first plurality of products as a first unit on a conveyor surface, wherein the first unit has a first leading end and a first trailing end; b) pushing the first unit in a machine direction on the conveyor surface with a first independent flight bar, the first independent flight bar in contact with the first trailing end of the first unit; c) engaging the first leading end of the first unit with a second independent flight bar; d) pushing the first unit in a machine direction off the conveyor surface and onto a lifting plate surface of a lifting plate, wherein during pushing onto the lifting plate surface the first independent flight bar maintains contact with the first trailing end of the first unit and the second independent flight bar maintains contact with the first leading end of the first unit; e) maintaining the position of the first independent flight bar and advancing the second independent flight bar; f) lowering the lifting plate such that the first unit resting on the lifting plate surface has a first top surface in a common plane with the conveyor surface, or below the conveyor surface; g) providing a second plurality of products as a second unit on the conveyor surface, wherein the second unit has a second leading end and a second trailing end; h) pushing the second unit in a machine direction on the conveyor surface with a third independent flight bar, the third independent flight bar in contact with the second trailing end of the second unit; i) engaging the second leading end of the second unit with the first independent flight bar; and pushing the second unit in a machine direction off the conveyor surface and onto the first top surface of the first unit to form a two-layer stacked unit, wherein during pushing onto the first top surface of the first unit the third independent flight bar maintains contact with the second trailing end of the second unit and the first independent flight bar maintains contact with the second leading end of the second unit. In pushing the units from behind with the flight bar, while also engaging the leading edge with another flight bar, the method maintains downstream and upstream control over the units while transferring and/or stacking.

In a non-limiting form of a method of stacking a four-layer stacked unit, the method may include the following steps: a) providing a first plurality of products as a first unit on a conveyor surface, wherein the first unit has a first leading end and a first trailing end; b) pushing the first unit in a machine direction on the conveyor surface with a first independent flight bar, the first independent flight bar in contact with the first trailing end of the first unit; c) engaging the first leading end of the first unit with a second independent flight bar; d) pushing the first unit in a machine direction off the conveyor surface and onto a lifting plate surface of a lifting plate, wherein during pushing onto the lifting plate surface the first independent flight bar maintains contact with the first trailing end of the first unit and the second independent flight bar maintains contact with the first leading end of the first unit; e) maintaining the position of the first independent flight bar and advancing the second independent flight bar; f) lowering the lifting plate such that the first unit resting on the lifting plate surface has a first top surface in a common plane with the conveyor surface, or below the conveyor surface; g) providing a second plurality of products as a second unit on the conveyor surface, wherein the second unit has a second leading end and a second trailing end; h) pushing the second unit in a machine direction on the conveyor surface with a third independent flight bar, the third independent flight bar in contact with the second trailing end of the second unit; i) engaging the second leading end of the second unit with the first independent flight bar; j) pushing the second unit in a machine direction off the conveyor surface and onto the top surface of the first unit to form a two-layer stacked unit, wherein during pushing onto the top surface of the first unit the third independent flight bar maintains contact with the second trailing end of the second unit and the first independent flight bar maintains contact with the second leading end of the second unit; k) maintaining the position of the second independent flight bar and advancing the first independent flight bar; l) lowering the lifting plate such that the second unit has a second top surface in a common plane with the conveyor surface, or below the conveyor surface; m) providing a third plurality of products as a third unit on the conveyor surface, wherein the third unit has a third leading end and a third trailing end; n) pushing the third unit in a machine direction on the conveyor surface with a fourth independent flight bar, the fourth independent flight bar in contact with the third trailing end of the third unit; o) engaging the third leading end of the third unit with the third independent flight bar; p) pushing the third unit in a machine direction off the conveyor surface and onto the second top surface of the second unit to form a three-layer stacked unit, wherein during pushing onto the second top surface of the second unit the fourth independent flight bar maintains contact with the third trailing end of the third unit and the third independent flight bar maintains contact with the third leading end of the third unit; q) maintaining the position of the fourth independent flight bar and advancing the third independent flight bar; r) lowering the lifting plate such that the third unit has a third top surface in a common plane with the conveyor surface, or below the conveyor surface; s) providing a fourth plurality of products as a fourth unit on the conveyor surface, wherein the fourth unit has a fourth leading end and a fourth trailing end; t) pushing the fourth unit in a machine direction on the conveyor surface with a fifth independent flight bar, the fifth independent flight bar in contact with the fourth trailing end of the fourth unit; u) engaging the fourth leading end of the fourth unit with the fourth independent flight bar; and v) pushing the fourth unit in a machine direction off the conveyor surface and onto the third top surface of the third unit to form a four-layer stacked unit, wherein during pushing onto the third top surface of the third unit the fifth independent flight bar maintains contact with the fourth trailing end of the fourth unit and the fourth independent flight bar maintains contact with the fourth leading end of the fourth unit. In pushing the units from behind with the flight bar, while also engaging the leading edge with another flight bar, the method maintains downstream and upstream control over the units while transferring and/or stacking.

Although illustrated in simplified schematic form, the drawings of FIGS. 7a-j and 8a-k may depict or reference one or more components of apparatus 100 described above. Accordingly, if a component is referenced in the methods detailed herein, the detail associated with such component detailed above is also applicable to the detail of the methods. For instance, when bar conveyor 220, 320 is referenced in the methods herein, the detail associated with bar conveyor 120 of apparatus 100 is also applicable to the detail of the methods.

Figure 7A:
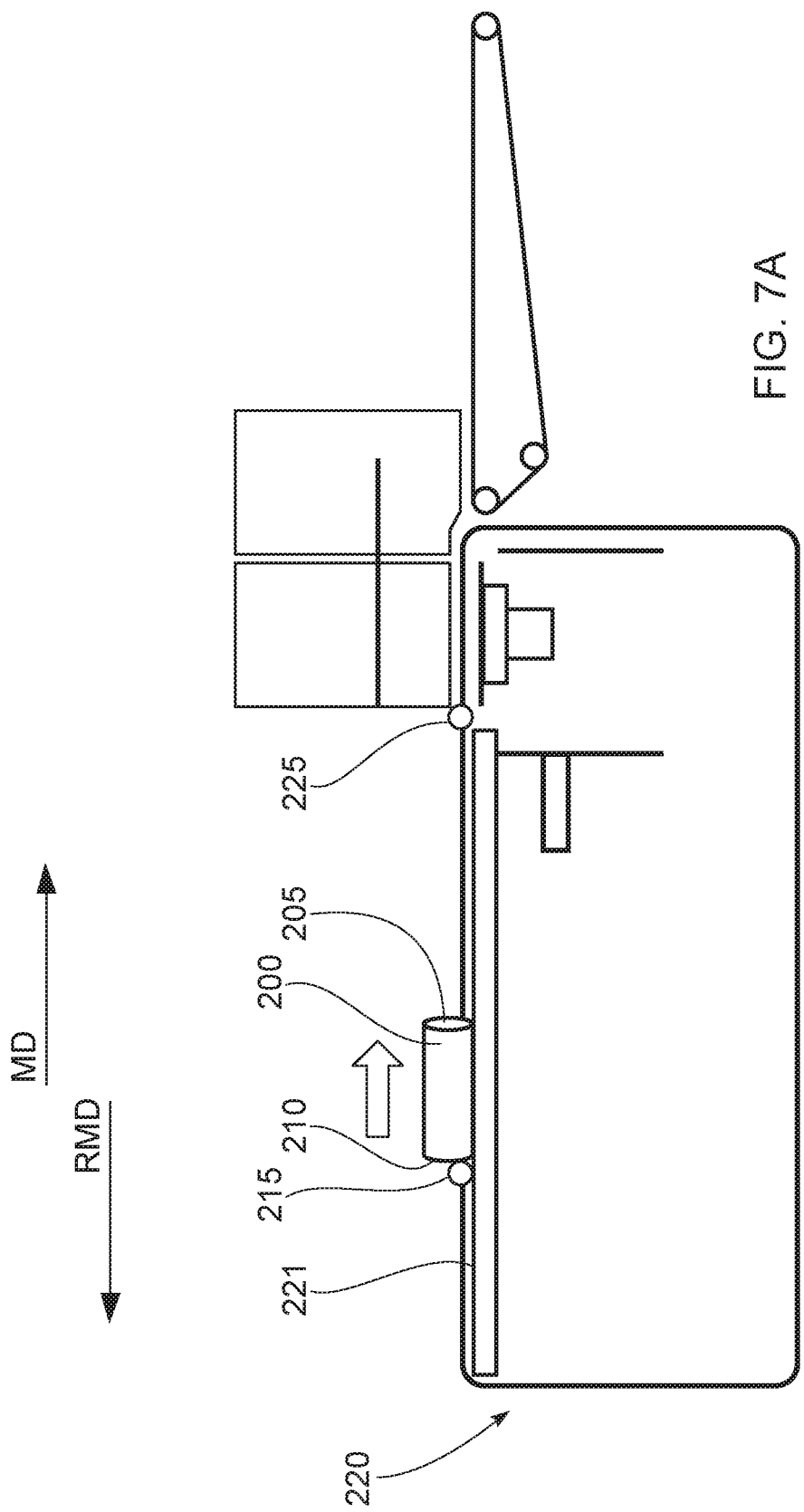

Referring to FIGS. 7a-j, a non-limiting form of a method of stacking a two-layer stacked unit utilizing the apparatuses detailed above is illustrated. In FIG. 7a, a first plurality of products is provided as a first unit 200. Although the schematic drawings shows a single cylindrical roll of sanitary paper product, such depiction is meant to represent a unit of one or more individual units, and thus, may include one, two, three, four, five, six, seven, eight, nine, ten, eleven, twelve, thirteen, fourteen, fifteen, sixteen, seventeen, eighteen, nineteen, or twenty rolls of sanitary paper products that are laned/grouped as a unit (such unit may be already wrapped in a polymeric film wrapper, or left unwrapped). First unit 200 has a first leading edge 205 and a first trailing edge 210, and is being pushed on the first trailing edge by a first independent flight bar 215 of a bar conveyor 220 in a machine direction. Second independent flight bat 225 is still ahead along the path of bar conveyor 220, and not in contact with first unit 200. Accordingly, at this stage, first independent flight bar 215 has downstream control over first unit 200 through contact with first trailing edge 210. Thus, the method provides downstream control over first unit 200 at the step illustrated in FIG. 7a.

Figure 7B:
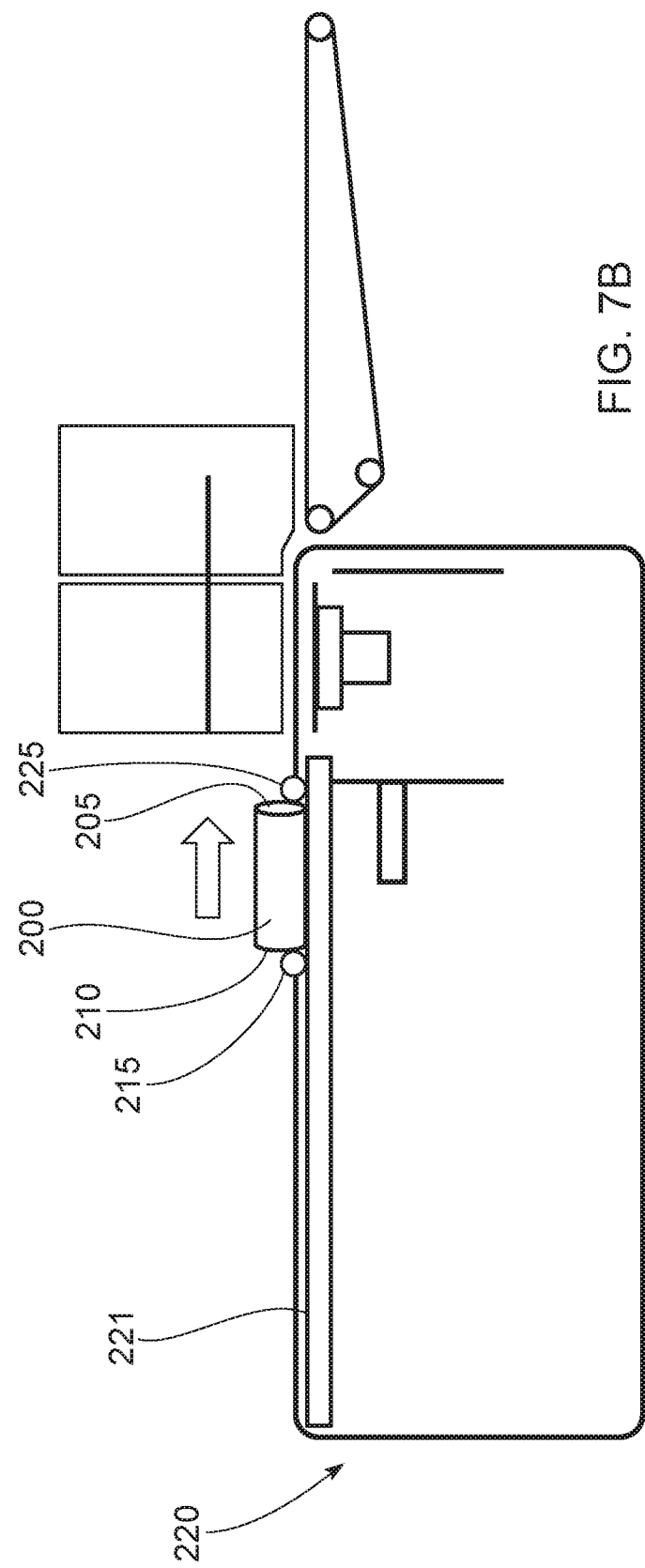

In FIG. 7b, first independent flight bar 215 has pushed first unit 200 farther along the path of bar conveyor 220 in the machine direction, and now second independent flight bar 225 is engaged with first leading edge 205. To achieve contact with first unit 200, second independent flight bar 225 can either maintain its position and wait for first leading edge 205 to contact it, or the second independent flight bar can be driven in a reverse machine direction until it contacts the first leading edge of the first unit. First and second independent flight bars can operate in this manner because they are driven by separate and independent drivetrains on bar conveyor 220, as described above. Accordingly, first independent flight bar 215 has downstream control over first unit 200 through contact with first trailing edge 210, and second independent flight bar 225 has upstream control over the first unit through contact with first leading edge 205. Thus, the method provides downstream and upstream control over first unit 200 at the step illustrated in FIG. 7b.

In FIG. 7c, with both downstream and upstream control over first unit 200 through contact with first and second independent flight bars 215,225, the first unit has been pushed by the first independent flight bar to rest on a lifting plate surface 230 of the lifting device. In FIG. 7d, lifting plate surface 230 is lowered, and first and second independent flight bars 215,225 lose contact with first unit 200. Second independent flight bar 225 now advances around the path of bar conveyor 220, and first independent flight bar 215 maintains its position. Lifting plate surface 230 is lowered such that first unit 200 resting on the lifting plate surface has a first top surface 201 that is in a common plane with a conveyor surface 221 of bar conveyor 220, or is below the conveyor surface.

In FIG. 7e, a second plurality of products is provided as a second unit 235. Similar to first unit, although the schematic drawings shows a single cylindrical roll of sanitary paper product, such depiction is meant to represent a unit of one or more individual units, and thus, may include one, two, three, four, five, six, seven, eight, nine, ten, eleven, twelve, thirteen, fourteen, fifteen, sixteen, seventeen, eighteen, nineteen, or twenty rolls of sanitary paper products that are laned/grouped as a unit (such unit may be already wrapped in a polymeric film wrapper, or left unwrapped). Second unit 235 has a second leading edge 240 and a second trailing edge 245, and is being pushed on the second trailing edge by a third independent flight bar 250 of a bar conveyor 220 in the machine direction. Accordingly, at this stage, third independent flight bar 250 has downstream control over second unit 235 through contact with second trailing edge 245. Thus, the method provides downstream control over second unit 235 at the step illustrated in FIG. 7e.

In FIG. 7f, third independent flight bar 250 has pushed second unit 235 farther along bar conveyor 220 in a machine direction, and now first independent flight bar 215 is engaged with second leading edge 240. To achieve contact with second unit 235, first independent flight bar 215 can either maintain its position and wait for second leading edge 240 to contact it, or the first independent flight bar can be driven in a reverse machine direction until it contacts the second leading edge of the second unit. First and third independent flight bars can operate in this manner because they are driven by separate and independent drivetrains on bar conveyor 220, as described above. Accordingly, third independent flight bar 245 has downstream control over second unit 235 through contact with second trailing edge 245, and first independent flight bar 215 has upstream control over the second unit through contact with second leading edge 240. Thus, the method provides downstream and upstream control over second unit 235 at the step illustrated in FIG. 7f.

In FIG. 7g, with both downstream and upstream control over second unit 235 through third and first independent flight bars 250,215, the second unit has been pushed by the third independent flight bar to be above first surface 201 of first unit 200. In FIG. 7h, lifting plate surface 230 is lowered, and third and first independent flight bars 250,215 lose contact with second unit 235, and second unit now rests on first surface 201 of first unit 200. First independent flight bar 215 now can advance around the path of bar conveyor 220, and third independent flight bar 250 maintains its position. Lifting plate surface 230 is lowered such that second unit 235 (resting on first top surface 201 of first unit 200) has a second top surface 236 that is in a common plane with a conveyor surface 221 of bar conveyor 220, or is below the conveyor surface. The units on lifting plate surface 230 can optionally be aligned in the machine direction with an alignment plate 255 as schematically shown by in FIG. 7h.

Figure 7J:
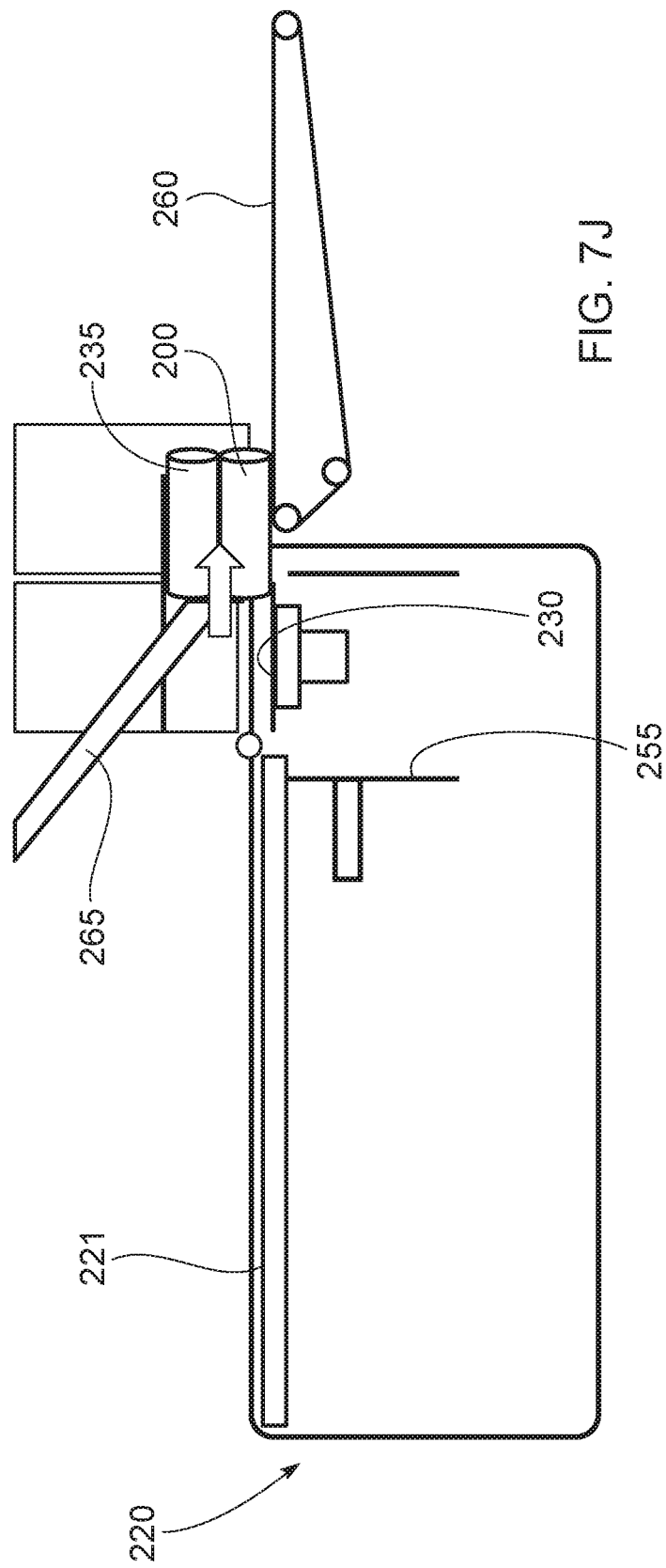

If a two-layer stacked unit (a stack of second unit 235 on top of first unit 200) is desired, the lifting device can then raise the two-layer stack such that lifting plate surface 230 is in a common plane with conveyor surface 221, as shown in FIG. 7i. At this point, the method can include the step of aligning the stacked unit in a cross machine direction through use of dynamic compression plates and/or static compression plates. As shown in FIG. 7j, the method can include the step of pushing the stacked unit off lifting plate surface 230 and onto the next operation in the packing line, e.g., a loading belt surface of a loading belt 260. The step of pushing can be done by a pusher 265, as detailed herein.

However, if more layers than two are desired for the multi-layer stacked unit, the steps depicted in FIGS. 7a-7h can be repeated until the desired number of layers in the stacked unit is achieved. Accordingly, although a two-stacked unit is depicted, the methods detailed herein may be used as the basis to create three, four, five, six, seven, eight, nine and ten layer stacked units.

Figure 8A:
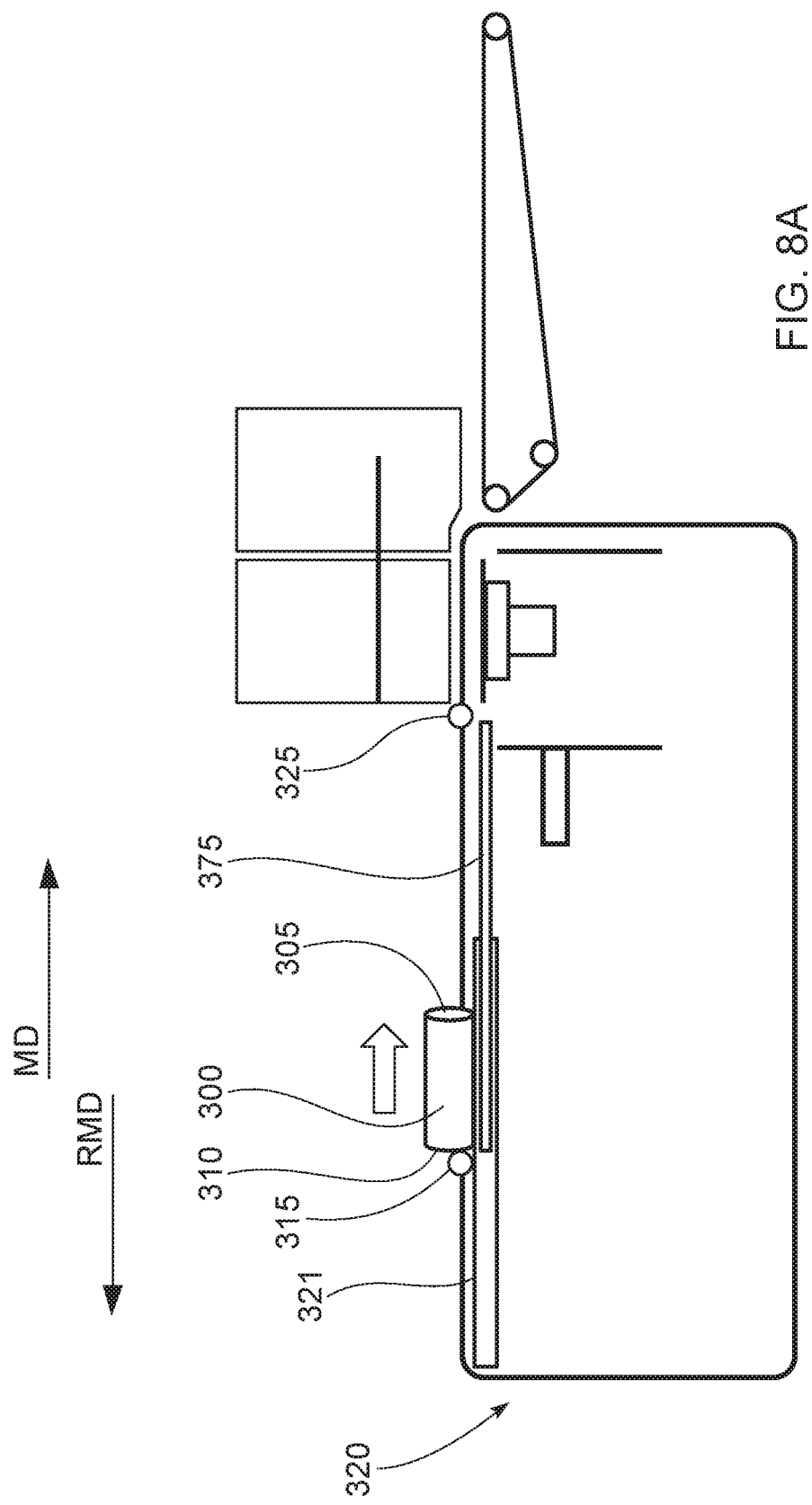

Referring to FIGS. 8a-l, another non-limiting form of a method of stacking a two-layer stacked unit utilizing the apparatuses detailed above is illustrated. In FIG. 8a, a first plurality of products is provided as a first unit 300. Although the schematic drawings shows a single cylindrical roll of sanitary paper product, such depiction is meant to represent a unit of one or more individual units, and thus, may include one, two, three, four, five, six, seven, eight, nine, ten, eleven, twelve, thirteen, fourteen, fifteen, sixteen, seventeen, eighteen, nineteen, or twenty rolls of sanitary paper products that are laned/grouped as a unit (such unit may be already wrapped in a polymeric film wrapper, or left unwrapped). First unit 300 has a first leading edge 305 and a first trailing edge 310, and is being pushed on the first trailing edge by a first independent flight bar 315 of a bar conveyor 320 in a machine direction. Accordingly, at this stage, first independent flight bar 315 has downstream control over first unit 300 through contact with first trailing edge 310. Thus, the method provides downstream control over first unit 300 at the step illustrated in FIG. 8a.

Figure 8B:
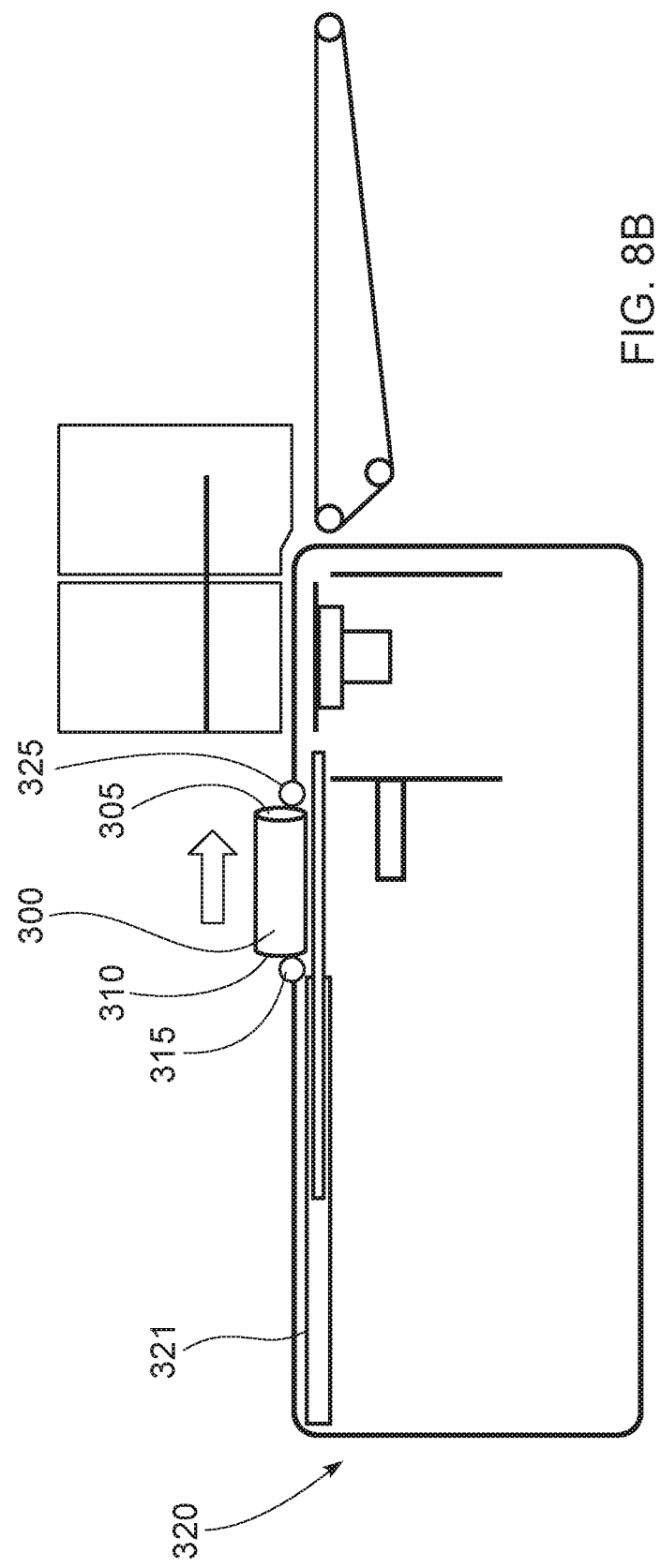

In FIG. 8b, first independent flight bar 315 has pushed first unit 300 farther along bar conveyor 320 in a machine direction, and now second independent flight bar 325 is engaged with first leading edge 305. To achieve contact with first unit 300, second independent flight bar 325 can either maintain its position and wait for first leading edge 305 to contact it, or the second independent flight bar can be driven in a reverse machine direction until it contacts the first leading edge of the first unit. First and second independent flight bars can operate in this manner because they are driven by separate and independent drivetrains on bar conveyor 320, as described above. Accordingly, first independent flight bar 315 has downstream control over first unit 300 through contact with first trailing edge 310, and second independent flight bar 325 has upstream control over the first unit through contact with first leading edge 305. Thus, the method provides downstream and upstream control over first unit 300 at the step illustrated in FIG. 8b.

In FIG. 8c, with both downstream and upstream control over first unit 300 through first and second independent flight bars 315,325, the first unit has been pushed by the first independent flight bar in a machine direction to rest on a lifting plate surface 330 of the lifting device. In FIG. 8d, lifting plate surface is lowered, and first and second independent flight bars 315,325 lose contact with first unit 300. Second independent flight bar 325 now advances around the path of bar conveyor 320, and first independent flight bar 315 maintains its position. Lifting plate surface 330 is lowered such that first unit 300 resting on the lifting plate surface has a first top surface 301 that is in a common plane with a conveyor surface 321 of bar conveyor 320, or is below the conveyor surface.

Figure 8E:
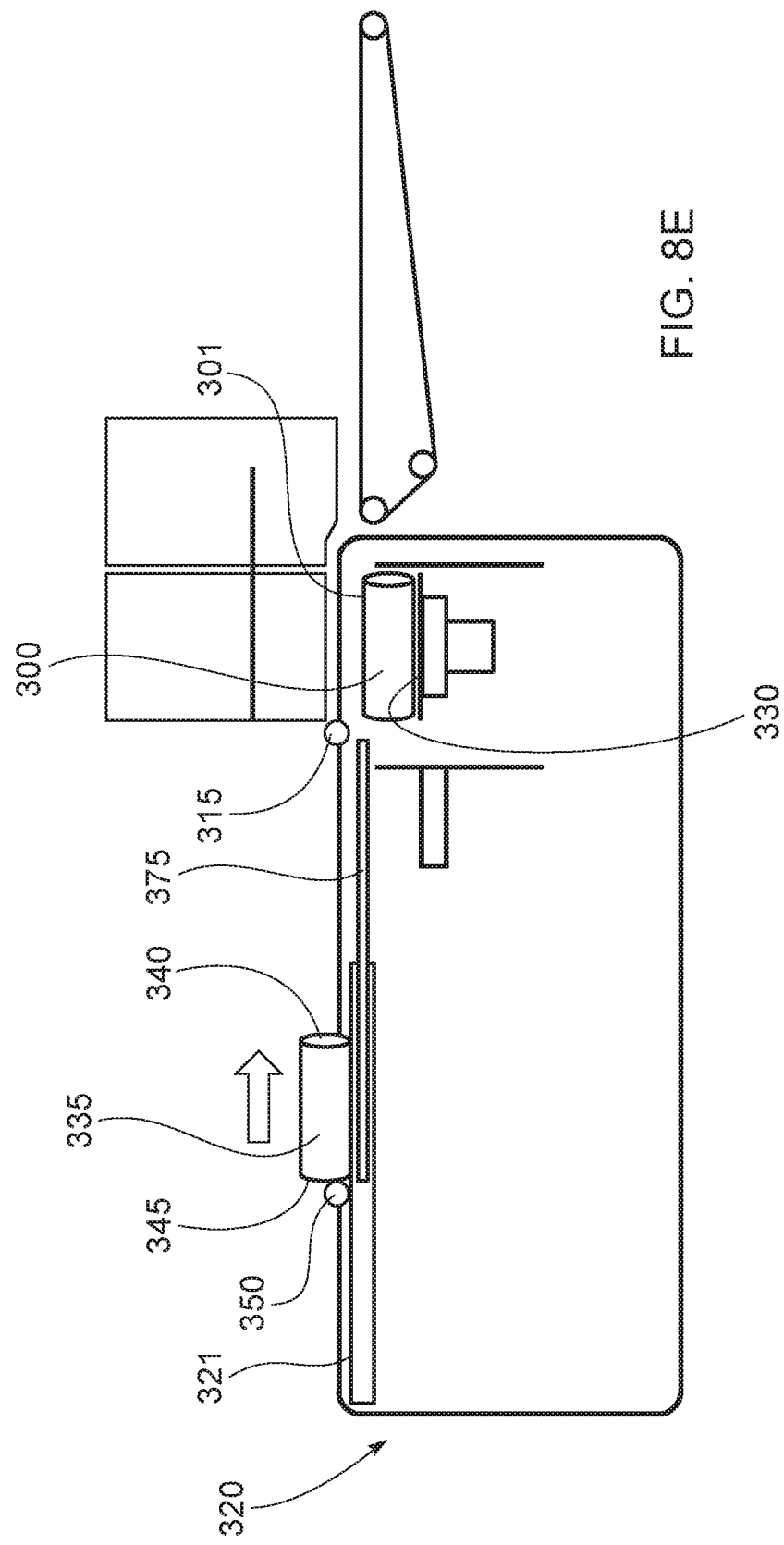

In FIG. 8e, a second plurality of products is provided as a second unit 335. Similar to first unit, although the schematic drawings shows a single cylindrical roll of sanitary paper product, such depiction is meant to represent a unit of one or more individual units, and thus, may include one, two, three, four, five, six, seven, eight, nine, ten, eleven, twelve, thirteen, fourteen, fifteen, sixteen, seventeen, eighteen, nineteen, or twenty rolls of sanitary paper products that are laned/grouped as a unit (such unit may be already wrapped in a polymeric film wrapper, or left unwrapped). Second unit 335 has a second leading edge 340 and a second trailing edge 345, and is being pushed in a machine direction on the second trailing edge by a third independent flight bar 350 of a bar conveyor 320. Accordingly, third independent flight bar 350 has downstream control over second unit 335 through contact with second trailing edge 345. Thus, the method provides downstream control over second unit 335 at the step illustrated in FIG. 8e.

In FIG. 8f, third independent flight bar 350 has pushed second unit 335 farther along bar conveyor 320, and now first independent flight bar 315 is engaged with second leading edge 340. To achieve contact with second unit 335, first independent flight bar 315 can either maintain its position and wait for second leading edge 340 to contact it, or the first independent flight bar can retract in a reverse machine direction until it contacts the second leading edge of the second unit. First and third independent flight bars can operate in this manner because they are driven by separate and independent drivetrains on bar conveyor 320, as described above. Accordingly, third independent flight bar 350 has downstream control over second unit 335 through contact with second trailing edge 345, and first independent flight bar 315 has upstream control over the second unit through contact with second leading edge 340. Thus, the method provides downstream and upstream control over second unit 335 at the step illustrated in FIG. 8f.

Figure 8H:
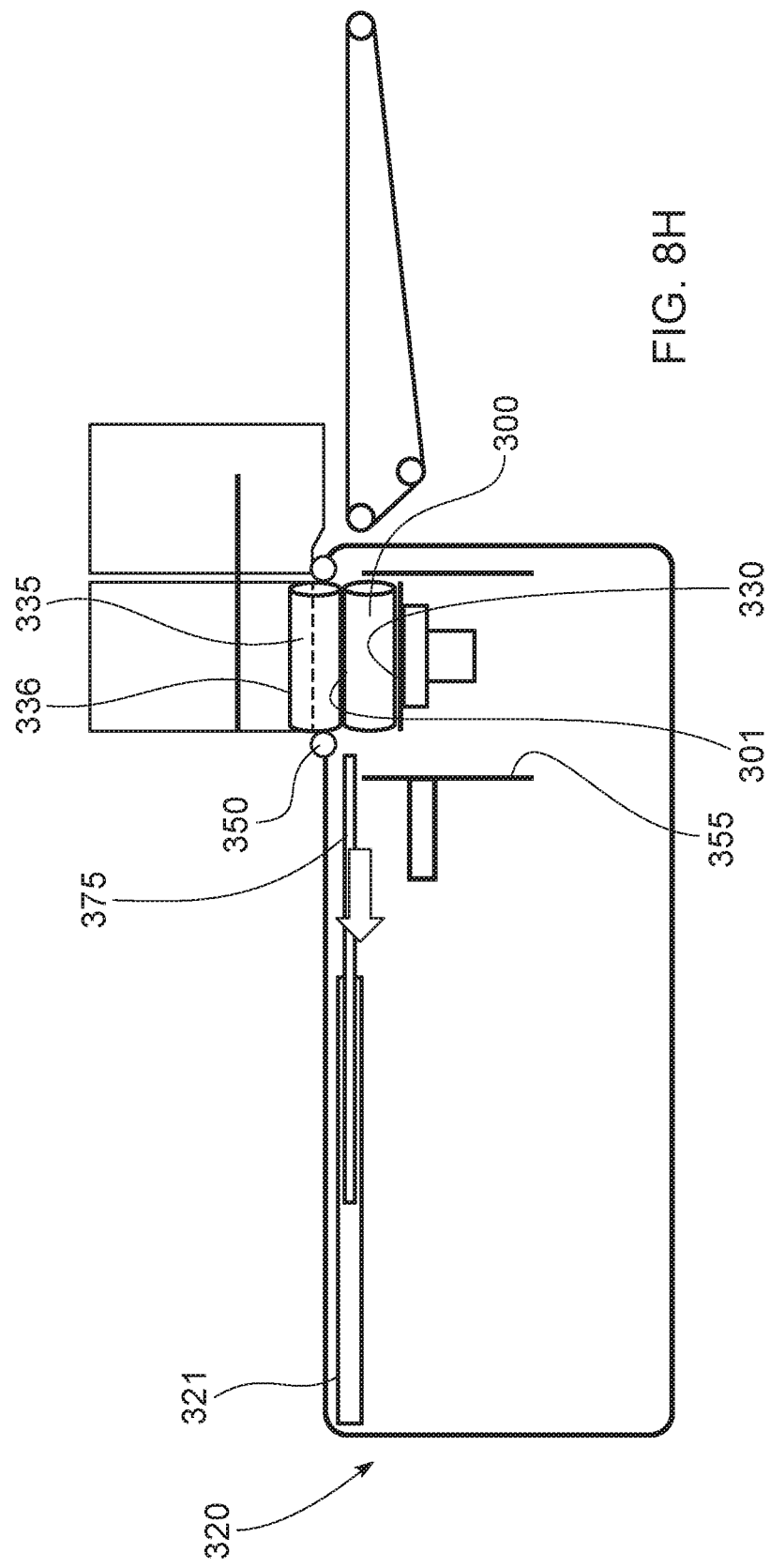

In FIG. 8g, further control over second unit 335 is maintained through use of moving plate 375. Moving plate 375 moves in a machine direction along with second unit 335 as the second unit moves in a machine direction into the area over lifting plate surface 330. When second unit 335 is completely over lifting plate surface 330, and third independent flight bar 350 has downstream control over second unit 335 through contact with second trailing edge 345, and first independent flight bar 315 has upstream control over the second unit through contact with second leading edge 340, moving plate 375 is quickly retracted in a reverse machine direction, allowing the second unit to drop. Accordingly, as depicted in FIG. 8h, still with both downstream and upstream control over second unit 335 through third and first independent flight bars 350,315, the second unit has been has been dropped to rest on first top surface 301 of first unit 300. In FIG. 8i, lifting plate surface 330 is lowered, and third and first independent flight bars 350,315 lose contact with second unit 335. First independent flight bar 315 advances around the path of bar conveyor 320, and third independent flight bar 350 maintains its position. Lifting plate surface 330 is lowered such that second unit 335 resting on the lifting plate surface has a second top surface 336 that is in a common plane with a conveyor surface 321 of bar conveyor 320, or is below the conveyor surface. The units on lifting plate surface 330 can optionally be aligned in the machine direction with an alignment plate 355 as schematically shown by in FIG. 8i.

If a two-layer stacked unit (a stack of second unit 335 on top of first unit 300) is desired, the lifting device can then raise the two-layer stack such that lifting plate surface 330 is in a common plane with conveyor surface 321, as shown in FIG. 8j. At this point, the method can include the step of aligning the stacked unit in a cross machine direction through use of dynamic compression plates and/or static compression plates. As shown in FIG. 8k, the method can include the step of pushing the stacked unit off lifting plate surface 330 and onto the next operation in the packing line, e.g., the loading belt surface of a loading belt 360. The step of pushing can be done by a pusher 365, as detailed herein.

However, if more layers than two are desired for the multi-layer stacked unit, the steps depicted in FIGS. 8a-8k can be repeated until the desired number of layers in the stacked unit is achieved. Although a two-stacked unit is depicted, the methods detailed herein may be used to create three, four, five, six, seven, eight, nine and ten layer stacked units.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:

1. An apparatus for transferring and/or stacking rolled products, the apparatus comprising:
a frame;
a bar conveyor associated with the frame, the bar conveyor comprising a plurality of first, second, third, and fourth flight bars that are independently driven by a plurality of independent drivetrains, wherein the bar conveyor has a conveyor surface;
wherein the first flight bar is configured to contact a first trailing end of a first unit of rolled products, and wherein the first flight bar is also configured to contact a second leading end of a second unit of rolled products;
wherein the second flight bar is configured to contact a first leading end of the first unit of rolled products;
wherein the third flight bar is configured to contact a second trailing end of the second unit of rolled products, and wherein the third flight bar is configured to contact a third leading end of a third unit of rolled products;
wherein the fourth flight bar is configured to contact a third trailing end of the third unit of rolled products;
a lifting device comprising a lifting plate, the lifting device being located within the bar conveyor, wherein the lifting plate comprises a lifting plate surface configured to be in a same plane as the conveyor surface or below the plane of the conveyor surface;
at least one pusher configured to push the rolled products; and
wherein the at least one pusher is configured to move along a first axis and wherein the lifting device is configured to move along a second axis, wherein the first axis is perpendicular to the second axis.

2. The apparatus of claim 1, further comprising a loading belt.

3. The apparatus of claim 1, further comprising a plurality of side guides disposed on the bar conveyor.

4. The apparatus of claim 2, further comprising a plurality of side compression plates.

5. The apparatus of claim 4, wherein the plurality of side compression plates comprise a pair of dynamic compression plates adjacent to the lifting device.

6. The apparatus of claim 5, wherein the plurality of side compression plates further comprise a pair of static plates adjacent to the loading belt.

7. The apparatus of claim 1, further comprising a top compression plate disposed above the lifting plate.

8. The apparatus of claim 1, further comprising a moving plate.

9. The apparatus of claim 1, further comprising a dynamic alignment plate.

10. The apparatus of claim 1, wherein the at least one pusher operates at variable speeds.

11. An apparatus for transferring and/or stacking rolled products, the apparatus comprising:
a frame;
a bar conveyor associated with the frame, the bar conveyor comprising a plurality of first, second, third, and fourth flight bars that are driven by a plurality of independent drivetrains;
wherein the first flight bar is configured to contact a first trailing end of a first unit of rolled products, and wherein the first flight bar is also configured to contact a second leading end of a second unit of rolled products;
wherein the second flight bar is configured to contact a first leading end of the first unit of rolled products;
wherein the third flight bar is configured to contact a second trailing end of the second unit of rolled products, and wherein the third flight bar is configured to contact a third leading end of a third unit of rolled products;
wherein the fourth flight bar is configured to contact a third trailing end of the third unit of rolled products;
a lifting device comprising a lifting plate, the lifting device being located within the bar conveyor;
a pair of dynamic side compression plates located adjacent the lifting device;
at least one pusher configured to push the rolled products;
a loading belt;
a pair of static side compression plates located adjacent the loading belt; and
wherein the at least one pusher is configured to move along a first axis and wherein the lifting device is configured to move along a second axis, wherein the first axis is perpendicular to the second axis.

12. The apparatus of claim 11, further comprising a plurality of side guides disposed on the bar conveyor.

13. The apparatus of claim 11, further comprising a top compression plate disposed above the lifting plate.

14. The apparatus of claim 11, further comprising a moving plate.

15. The apparatus of claim 11, further comprising a dynamic alignment plate.

16. The apparatus of claim 11, wherein the at least one pusher operates at variable speeds.

17. An apparatus for transferring and/or stacking rolled products, the apparatus comprising:
a frame;
a bar conveyor associated with the frame, the bar conveyor comprising a conveyor surface, a receiving end, a transfer end, and a plurality of first, second, third, and fourth flight bars that are driven by a plurality of independent drivetrains;
wherein the first flight bar is configured to contact a first trailing end of a first unit of rolled products, and wherein the first flight bar is also configured to contact a second leading end of a second unit of rolled products;
wherein the second flight bar is configured to contact a first leading end of the first unit of rolled products;
wherein the third flight bar is configured to contact a second trailing end of the second unit of rolled products, and wherein the third flight bar is configured to contact a third leading end of a third unit of rolled products;
wherein the fourth flight bar is configured to contact a third trailing end of the third unit of rolled products;
a lifting device comprising a lifting plate having a lifting plate surface, the lifting plate being located between the receiving end of the bar conveyor and the transfer end of the bar conveyor;

at least one pusher configured to push the rolled products; and wherein the at least one pusher is configured to move along a first axis and wherein the lifting device is configured to move along a second axis, wherein the first axis is perpendicular to the second axis.

18. The apparatus of claim 17, wherein the lifting plate is capable of moving between a first position and a second position, wherein when the lifting plate is in the first position the lifting plate surface is in a common plane with the conveyor surface.

19. The apparatus of claim 17, wherein when the lifting plate is in the second position the lifting plate surface is in a different plane as the conveyor surface.

20. The apparatus of claim 19, wherein a flight path of the flight bars travels over both the conveyor surface and the lifting plate surface when traveling from the receiving end of the bar conveyor to the transfer end of the bar conveyor.

\* \* \* \* \*